US011922893B2

(12) United States Patent
Crounse et al.

(10) Patent No.: US 11,922,893 B2
(45) Date of Patent: Mar. 5, 2024

(54) HIGH VOLTAGE DRIVING USING TOP PLANE SWITCHING WITH ZERO VOLTAGE FRAMES BETWEEN DRIVING FRAMES

(71) Applicant: E INK CORPORATION, Billerica, MA (US)

(72) Inventors: Kenneth R. Crounse, Somerville, MA (US); Stephen J. Telfer, Arlington, MA (US); Ana L. Lattes, Newton, MA (US); Christopher L Hoogeboom, Burlington, MA (US); Richard J. Paolini, Jr., Framingham, MA (US); Seth J. Bishop, Framingham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/079,300

(22) Filed: Dec. 12, 2022

(65) Prior Publication Data

US 2023/0197025 A1 Jun. 22, 2023

Related U.S. Application Data

(60) Provisional application No. 63/422,884, filed on Nov. 4, 2022, provisional application No. 63/292,440, filed on Dec. 22, 2021.

(51) Int. Cl.
*G09G 3/34* (2006.01)

(52) U.S. Cl.
CPC ..... *G09G 3/344* (2013.01); *G09G 2300/0426* (2013.01); *G09G 2300/0842* (2013.01)

(58) Field of Classification Search
None
See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II et al. |
| 5,930,026 | A | 7/1999 | Jacobson et al. |
| 6,017,584 | A | 1/2000 | Albert et al. |
| 6,130,774 | A | 10/2000 | Albert et al. |
| 6,144,361 | A | 11/2000 | Gordon, II et al. |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |

(Continued)

FOREIGN PATENT DOCUMENTS

KR 20140015040 A 2/2014

OTHER PUBLICATIONS

Kitamura, T. et al., "Electrical toner movement for electronic paper-like display", Asia Display/IDW '01, pp. 1517-1520, Paper HCS1-1 (2001). 2001.

(Continued)

*Primary Examiner* — Matthew Yeung
(74) *Attorney, Agent, or Firm* — Brian D. Bean

(57) ABSTRACT

Improved methods for driving an active matrix of pixel electrodes controlled with thin film transistors when the voltage on a top electrode is being altered between driving frames. The methods described increase performance by providing smaller swings in the overall voltage between the top electrode and pixel electrode while reducing stress on the thin film transistor.

20 Claims, 25 Drawing Sheets

(56) References Cited

U.S. PATENT DOCUMENTS

| | | | |
|---|---|---|---|
| 6,271,823 | B1 | 8/2001 | Gordon, II et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,545,797 | B2 | 4/2003 | Chen et al. |
| 6,664,944 | B1 | 12/2003 | Albert et al. |
| 6,672,921 | B1 | 1/2004 | Liang et al. |
| 6,753,999 | B2 | 6/2004 | Zehner et al. |
| 6,788,449 | B2 | 9/2004 | Liang et al. |
| 6,788,452 | B2 | 9/2004 | Liang et al. |
| 6,825,970 | B2 | 11/2004 | Goenaga et al. |
| 6,864,875 | B2 | 3/2005 | Drzaic et al. |
| 6,866,760 | B2 | 3/2005 | Paolini, Jr. et al. |
| 6,900,851 | B2 | 5/2005 | Morrison et al. |
| 6,914,714 | B2 | 7/2005 | Chen et al. |
| 6,922,276 | B2 | 7/2005 | Zhang et al. |
| 6,972,893 | B2 | 12/2005 | Chen et al. |
| 6,982,178 | B2 | 1/2006 | LeCain et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |
| 7,038,656 | B2 | 5/2006 | Liang et al. |
| 7,038,670 | B2 | 5/2006 | Liang et al. |
| 7,046,228 | B2 | 5/2006 | Liang et al. |
| 7,052,571 | B2 | 5/2006 | Wang et al. |
| 7,061,166 | B2 | 6/2006 | Kuniyasu |
| 7,061,662 | B2 | 6/2006 | Chung et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,144,942 | B2 | 12/2006 | Zang et al. |
| 7,167,155 | B1 | 1/2007 | Albert et al. |
| 7,170,670 | B2 | 1/2007 | Webber |
| 7,176,880 | B2 | 2/2007 | Amundson et al. |
| 7,177,066 | B2 | 2/2007 | Chung et al. |
| 7,193,625 | B2 | 3/2007 | Danner et al. |
| 7,202,847 | B2 | 4/2007 | Gates |
| 7,236,291 | B2 | 6/2007 | Kaga et al. |
| 7,242,514 | B2 | 7/2007 | Chung et al. |
| 7,259,744 | B2 | 8/2007 | Arango et al. |
| 7,304,787 | B2 | 12/2007 | Whitesides et al. |
| 7,312,784 | B2 | 12/2007 | Baucom et al. |
| 7,312,794 | B2 | 12/2007 | Zehner et al. |
| 7,321,459 | B2 | 1/2008 | Masuda et al. |
| 7,327,511 | B2 | 2/2008 | Whitesides et al. |
| 7,339,715 | B2 | 3/2008 | Webber et al. |
| 7,385,751 | B2 | 6/2008 | Chen et al. |
| 7,408,699 | B2 | 8/2008 | Wang et al. |
| 7,411,719 | B2 | 8/2008 | Paolini, Jr. et al. |
| 7,453,445 | B2 | 11/2008 | Amundson |
| 7,492,339 | B2 | 2/2009 | Amundson |
| 7,492,505 | B2 | 2/2009 | Liang et al. |
| 7,528,822 | B2 | 5/2009 | Amundson et al. |
| 7,535,624 | B2 | 5/2009 | Amundson et al. |
| 7,545,358 | B2 | 6/2009 | Gates et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,667,684 | B2 | 2/2010 | Jacobson et al. |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,684,108 | B2 | 3/2010 | Wang et al. |
| 7,688,297 | B2 | 3/2010 | Zehner et al. |
| 7,715,088 | B2 | 5/2010 | Liang et al. |
| 7,729,039 | B2 | 6/2010 | LeCain et al. |
| 7,733,311 | B2 | 6/2010 | Amundson et al. |
| 7,733,335 | B2 | 6/2010 | Zehner et al. |
| 7,787,169 | B2 | 8/2010 | Abramson et al. |
| 7,791,789 | B2 | 9/2010 | Albert et al. |
| 7,800,813 | B2 | 9/2010 | Wu et al. |
| 7,821,702 | B2 | 10/2010 | Liang et al. |
| 7,839,564 | B2 | 11/2010 | Whitesides et al. |
| 7,859,742 | B1 | 12/2010 | Chiu et al. |
| 7,910,175 | B2 | 3/2011 | Webber |
| 7,952,557 | B2 | 5/2011 | Amundson |
| 7,952,790 | B2 | 5/2011 | Honeyman et al. |
| 7,956,841 | B2 | 6/2011 | Albert et al. |
| 7,982,479 | B2 | 7/2011 | Wang et al. |
| 7,982,941 | B2 | 7/2011 | Lin et al. |
| 7,999,787 | B2 | 8/2011 | Amundson et al. |
| 8,009,348 | B2 | 8/2011 | Zehner et al. |
| 8,040,594 | B2 | 10/2011 | Paolini, Jr. et al. |
| 8,054,526 | B2 | 11/2011 | Bouchard |
| 8,077,141 | B2 | 12/2011 | Duthaler et al. |
| 8,098,418 | B2 | 1/2012 | Paolini, Jr. et al. |
| 8,125,501 | B2 | 2/2012 | Amundson et al. |
| 8,139,050 | B2 | 3/2012 | Jacobson et al. |
| 8,159,636 | B2 | 4/2012 | Sun et al. |
| 8,174,490 | B2 | 5/2012 | Whitesides et al. |
| 8,213,076 | B2 | 7/2012 | Albert et al. |
| 8,243,013 | B1 | 8/2012 | Sprague et al. |
| 8,274,472 | B1 | 9/2012 | Wang et al. |
| 8,289,250 | B2 | 10/2012 | Zehner et al. |
| 8,300,006 | B2 | 10/2012 | Zhou et al. |
| 8,305,341 | B2 | 11/2012 | Arango et al. |
| 8,314,784 | B2 | 11/2012 | Ohkami et al. |
| 8,325,130 | B2 | 12/2012 | Nam |
| 8,363,299 | B2 | 1/2013 | Paolini, Jr. et al. |
| 8,373,649 | B2 | 2/2013 | Low et al. |
| 8,384,658 | B2 | 2/2013 | Albert et al. |
| 8,422,116 | B2 | 4/2013 | Sprague et al. |
| 8,441,714 | B2 | 5/2013 | Paolini, Jr. et al. |
| 8,441,716 | B2 | 5/2013 | Paolini, Jr. et al. |
| 8,456,414 | B2 | 6/2013 | Lin et al. |
| 8,462,102 | B2 | 6/2013 | Wong et al. |
| 8,466,852 | B2 | 6/2013 | Drzaic et al. |
| 8,503,063 | B2 | 8/2013 | Sprague |
| 8,514,168 | B2 | 8/2013 | Chung et al. |
| 8,537,105 | B2 | 9/2013 | Chiu et al. |
| 8,558,783 | B2 | 10/2013 | Wilcox et al. |
| 8,558,785 | B2 | 10/2013 | Zehner et al. |
| 8,558,786 | B2 | 10/2013 | Lin |
| 8,558,855 | B2 | 10/2013 | Sprague et al. |
| 8,576,164 | B2 | 11/2013 | Sprague et al. |
| 8,576,259 | B2 | 11/2013 | Lin et al. |
| 8,576,470 | B2 | 11/2013 | Paolini, Jr. et al. |
| 8,576,475 | B2 | 11/2013 | Huang et al. |
| 8,593,396 | B2 | 11/2013 | Amundson et al. |
| 8,593,721 | B2 | 11/2013 | Albert et al. |
| 8,605,032 | B2 | 12/2013 | Liu et al. |
| 8,605,354 | B2 | 12/2013 | Zhang et al. |
| 8,643,595 | B2 | 2/2014 | Chung et al. |
| 8,649,084 | B2 | 2/2014 | Wang et al. |
| 8,665,206 | B2 | 3/2014 | Lin et al. |
| 8,670,174 | B2 | 3/2014 | Sprague et al. |
| 8,681,191 | B2 | 3/2014 | Yang et al. |
| 8,704,756 | B2 | 4/2014 | Lin |
| 8,717,664 | B2 | 5/2014 | Wang et al. |
| 8,730,153 | B2 | 5/2014 | Sprague et al. |
| 8,786,935 | B2 | 7/2014 | Sprague |
| 8,797,634 | B2 | 8/2014 | Paolini, Jr. et al. |
| 8,810,525 | B2 | 8/2014 | Sprague |
| 8,810,899 | B2 | 8/2014 | Sprague et al. |
| 8,830,559 | B2 | 9/2014 | Honeyman et al. |
| 8,873,129 | B2 | 10/2014 | Paolini, Jr. et al. |
| 8,902,153 | B2 | 12/2014 | Bouchard et al. |
| 8,902,491 | B2 | 12/2014 | Wang et al. |
| 8,917,439 | B2 | 12/2014 | Wang et al. |
| 8,928,562 | B2 | 1/2015 | Gates et al. |
| 8,928,641 | B2 | 1/2015 | Chiu et al. |
| 8,964,282 | B2 | 2/2015 | Wang et al. |
| 8,976,444 | B2 | 3/2015 | Zhang et al. |
| 9,013,394 | B2 | 4/2015 | Lin |
| 9,013,783 | B2 | 4/2015 | Sprague |
| 9,019,197 | B2 | 4/2015 | Lin |
| 9,019,198 | B2 | 4/2015 | Lin et al. |
| 9,019,318 | B2 | 4/2015 | Sprague et al. |

(56) References Cited

U.S. PATENT DOCUMENTS

| | | | |
|---|---|---|---|
| 9,082,352 | B2 | 7/2015 | Cheng et al. |
| 9,116,412 | B2 | 8/2015 | Lin |
| 9,146,439 | B2 | 9/2015 | Zhang |
| 9,164,207 | B2 | 10/2015 | Honeyman et al. |
| 9,170,467 | B2 | 10/2015 | Whitesides et al. |
| 9,170,468 | B2 | 10/2015 | Lin et al. |
| 9,171,508 | B2 | 10/2015 | Sprague et al. |
| 9,182,646 | B2 | 11/2015 | Paolini, Jr. et al. |
| 9,195,111 | B2 | 11/2015 | Anseth et al. |
| 9,199,441 | B2 | 12/2015 | Danner |
| 9,218,773 | B2 | 12/2015 | Sun et al. |
| 9,224,338 | B2 | 12/2015 | Chan et al. |
| 9,224,342 | B2 | 12/2015 | Sprague et al. |
| 9,224,344 | B2 | 12/2015 | Chung et al. |
| 9,230,492 | B2 | 1/2016 | Harrington et al. |
| 9,251,736 | B2 | 2/2016 | Lin et al. |
| 9,262,973 | B2 | 2/2016 | Wu et al. |
| 9,268,191 | B2 | 2/2016 | Paolini, Jr. et al. |
| 9,269,311 | B2 | 2/2016 | Amundson |
| 9,279,906 | B2 | 3/2016 | Kang |
| 9,285,649 | B2 | 3/2016 | Du et al. |
| 9,293,511 | B2 | 3/2016 | Jacobson et al. |
| 9,299,294 | B2 | 3/2016 | Lin et al. |
| 9,341,916 | B2 | 5/2016 | Telfer et al. |
| 9,360,733 | B2 | 6/2016 | Wang et al. |
| 9,361,836 | B1 | 6/2016 | Telfer et al. |
| 9,373,289 | B2 | 6/2016 | Sprague et al. |
| 9,383,623 | B2 | 7/2016 | Lin et al. |
| 9,390,066 | B2 | 7/2016 | Smith et al. |
| 9,390,661 | B2 | 7/2016 | Chiu et al. |
| 9,412,314 | B2 | 8/2016 | Amundson et al. |
| 9,423,666 | B2 | 8/2016 | Wang et al. |
| 9,459,510 | B2 | 10/2016 | Lin |
| 9,460,666 | B2 | 10/2016 | Sprague et al. |
| 9,495,918 | B2 | 11/2016 | Harrington et al. |
| 9,501,981 | B2 | 11/2016 | Lin et al. |
| 9,513,527 | B2 | 12/2016 | Chan et al. |
| 9,513,743 | B2 | 12/2016 | Sjodin et al. |
| 9,514,667 | B2 | 12/2016 | Lin |
| 9,541,814 | B2 | 1/2017 | Lin et al. |
| 9,542,895 | B2 | 1/2017 | Gates et al. |
| 9,558,696 | B2 | 1/2017 | Son et al. |
| 9,564,088 | B2 | 2/2017 | Wilcox et al. |
| 9,612,502 | B2 | 4/2017 | Danner et al. |
| 9,620,048 | B2 | 4/2017 | Sim et al. |
| 9,620,067 | B2 | 4/2017 | Harrington et al. |
| 9,671,668 | B2 | 6/2017 | Chan et al. |
| 9,672,766 | B2 | 6/2017 | Sjodin |
| 9,691,333 | B2 | 6/2017 | Cheng et al. |
| 9,697,778 | B2 | 7/2017 | Telfer et al. |
| 9,721,495 | B2 | 8/2017 | Harrington et al. |
| 9,740,076 | B2 | 8/2017 | Paolini, Jr. et al. |
| 9,759,980 | B2 | 9/2017 | Du et al. |
| 9,792,861 | B2 | 10/2017 | Chang et al. |
| 9,792,862 | B2 | 10/2017 | Hung et al. |
| 9,812,073 | B2 | 11/2017 | Lin et al. |
| 9,921,451 | B2 | 3/2018 | Telfer et al. |
| 9,966,018 | B2 | 5/2018 | Gates et al. |
| 10,037,735 | B2 | 7/2018 | Amundson |
| 10,162,242 | B2 | 12/2018 | Wang et al. |
| 10,209,556 | B2 | 2/2019 | Rosenfeld et al. |
| 10,229,641 | B2 | 3/2019 | Yang et al. |
| 10,276,109 | B2 | 4/2019 | Crounse et al. |
| 10,319,313 | B2 | 6/2019 | Harris et al. |
| 10,339,876 | B2 | 7/2019 | Lin et al. |
| 10,353,266 | B2 | 7/2019 | Bouchard et al. |
| 10,444,553 | B2 | 10/2019 | Laxton |
| 10,467,984 | B2 | 11/2019 | Buckley et al. |
| 10,514,583 | B2 | 12/2019 | Zhang |
| 10,573,257 | B2 | 2/2020 | Emelie et al. |
| 10,593,272 | B2 | 3/2020 | Telfer et al. |
| 10,672,350 | B2 | 6/2020 | Amundson et al. |
| 2003/0102858 | A1 | 6/2003 | Jacobson et al. |
| 2004/0246562 | A1 | 12/2004 | Chung et al. |
| 2005/0253777 | A1 | 11/2005 | Zehner et al. |
| 2007/0091418 | A1 | 4/2007 | Danner et al. |
| 2007/0103427 | A1 | 5/2007 | Zhou et al. |
| 2007/0176912 | A1 | 8/2007 | Beames et al. |
| 2008/0024429 | A1 | 1/2008 | Zehner |
| 2008/0024482 | A1 | 1/2008 | Gates et al. |
| 2008/0043318 | A1 | 2/2008 | Whitesides et al. |
| 2008/0048970 | A1 | 2/2008 | Drzaic et al. |
| 2008/0136774 | A1 | 6/2008 | Harris et al. |
| 2008/0303780 | A1 | 12/2008 | Sprague et al. |
| 2009/0174651 | A1 | 7/2009 | Jacobson et al. |
| 2009/0225398 | A1 | 9/2009 | Duthaler et al. |
| 2009/0322721 | A1 | 12/2009 | Zehner et al. |
| 2010/0156780 | A1 | 6/2010 | Jacobson et al. |
| 2010/0194733 | A1 | 8/2010 | Lin et al. |
| 2010/0194789 | A1 | 8/2010 | Lin et al. |
| 2010/0220121 | A1 | 9/2010 | Zehner et al. |
| 2010/0231580 | A1* | 9/2010 | Miyasaka .............. G09G 3/344 345/107 |
| 2010/0259524 | A1* | 10/2010 | Markvoort ............. G09G 3/344 345/211 |
| 2010/0265561 | A1 | 10/2010 | Gates et al. |
| 2010/0289838 | A1* | 11/2010 | Markvoort ............. G09G 3/344 345/691 |
| 2011/0043543 | A1 | 2/2011 | Chen et al. |
| 2011/0063314 | A1 | 3/2011 | Chiu et al. |
| 2011/0175875 | A1 | 7/2011 | Lin et al. |
| 2011/0193840 | A1 | 8/2011 | Amundson et al. |
| 2011/0193841 | A1 | 8/2011 | Amundson et al. |
| 2011/0199671 | A1 | 8/2011 | Amundson et al. |
| 2011/0221740 | A1 | 9/2011 | Yang et al. |
| 2012/0001957 | A1 | 1/2012 | Liu et al. |
| 2012/0092319 | A1* | 4/2012 | van Veenendaal ..... G09G 3/344 345/211 |
| 2012/0098740 | A1 | 4/2012 | Chiu et al. |
| 2012/0326957 | A1 | 12/2012 | Drzaic et al. |
| 2013/0063333 | A1 | 3/2013 | Arango et al. |
| 2013/0242378 | A1 | 9/2013 | Paolini, Jr. et al. |
| 2013/0249782 | A1 | 9/2013 | Wu et al. |
| 2013/0278995 | A1 | 10/2013 | Drzaic et al. |
| 2014/0009817 | A1 | 1/2014 | Wilcox et al. |
| 2014/0055840 | A1 | 2/2014 | Zang et al. |
| 2014/0078576 | A1 | 3/2014 | Sprague |
| 2014/0204012 | A1 | 7/2014 | Wu et al. |
| 2014/0240210 | A1 | 8/2014 | Wu et al. |
| 2014/0253425 | A1 | 9/2014 | Zalesky et al. |
| 2014/0293398 | A1 | 10/2014 | Wang et al. |
| 2014/0362213 | A1 | 12/2014 | Tseng |
| 2015/0005720 | A1 | 1/2015 | Zang et al. |
| 2015/0118390 | A1 | 4/2015 | Rosenfeld et al. |
| 2015/0262255 | A1 | 9/2015 | Khajehnouri et al. |
| 2015/0262551 | A1 | 9/2015 | Zehner et al. |
| 2015/0268531 | A1 | 9/2015 | Wang et al. |
| 2015/0301246 | A1 | 10/2015 | Zang et al. |
| 2016/0012710 | A1 | 1/2016 | Lu et al. |
| 2016/0048054 | A1 | 2/2016 | Danner |
| 2016/0140910 | A1 | 5/2016 | Amundson |
| 2016/0180777 | A1 | 6/2016 | Lin et al. |

OTHER PUBLICATIONS

Yamaguchi, Y. et al., "Toner display using insulative particles charged triboelectrically", Asia Display/IDW '01, pp. 1729-1730, Paper AMD4-4 (2001). 2001.

Korean Intellectual Property Office, "International Search Report and Written Opinion", PCT/US2022/052559, dated Apr. 21, 2023.

* cited by examiner

HIGH VOLTAGE DRIVING USING TOP PLANE SWITCHING WITH ZERO VOLTAGE FRAMES BETWEEN DRIVING FRAMES

RELATED APPLICATIONS

This application claims priority to U.S. Provisional Patent Application No. 63/292,440, filed Dec. 22, 2021 and to U.S. Provisional Patent Application No. 63/422,884, filed Nov. 4, 2022. All patents and publications disclosed herein are incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color options have become commercially-available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP®) also included four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, and 10,593,272.

This invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances two of the particles will be positively-charged, and two particles will be negatively-charged. In some instances, one positively-charged particle will have a thick polymer shell and one negatively-charged particle has a thick polymer shell.

As described in U.S. Pat. No. 9,921,451, especially with respect to Table 3 of the '451 patent, improved color discrimination can be achieved with a "standard" active matrix backplane (i.e., including an array of thin-film transistors (TFT) that use amorphous silicon) by using so-called "top plane switching" in which the bias on the top electrode is altered during driving to achieve a larger voltage drop between the top electrode and the backplane. For example, to achieve a good magenta state it may be necessary to apply a voltage of +15V to the top electrode and −15V to the pixel electrode of the desired active matrix pixel so that the electrophoretic medium experiences an overall voltage drop of +30V (See FIG. 6A of the '451 patent). Later, when it is desired to, for example, produce a good yellow state, it may be necessary to apply a voltage of −15V to the top electrode and +15V to the pixel electrode of the desired active matrix pixel so that the electrophoretic medium experiences an overall voltage drop of −30V. (See FIG. 6C of the '451 patent). As described in more detail in the '451 patent, top plane switching can be used to address the electrophoretic medium as well as to clear prior optical states and to DC balance waveforms.

TFT-based thin film electronics may be used to control the addressing of pixel electrode for high-resolution displays such as LCD and EPD. Driver circuits can be integrated directly into the AM-TFT substrate, and TFT-based electronics are well suited to control pixel electrode voltages for EPD applications. TFTs can be made using a wide variety of semiconductor materials. A common material is silicon. The characteristics of a silicon-based TFT depend on the silicon's crystalline state, that is, the semiconductor layer can be either amorphous silicon (a-Si), microcrystalline silicon, or it can be annealed into low-temperature polysilicon (LTPS). TFTs based on a-Si are cheap to produce so that relatively large substrate areas can be manufactured at relatively low cost. One downside of TFTs based upon a-Si is that the bias across the TFT is typically limited to no more than 45V. Beyond 45V, the transistor can fail or have "breakthrough" during which excess current moves through the transistor and charges, e.g., a pixel electrode beyond the desired level. More exotic materials, such as metal oxides may also be used to fabricate thin film transistor arrays, and achieve higher voltages, but the fabrication costs of such devices is typically high because of the specialized equipment needed to handle/deposit the metal oxides.

For active matrix devices, the drive signals are often output from a controller to gate and scan drivers that, in turn, provide the required current-voltage inputs to active the various TFT in the active matrix. However, controller-drivers capable of receiving, e.g., image data, and outputting the necessary current-voltage inputs to active the TFTs are commercially available. Most active matrices of thin-film-transistors are drive with line-at-a-time (a.k.a., line-by-line) addressing, which is used in the vast majority of LCD and EPD displays. In such systems, one or more controllers are used to deliver a voltage to a series of scan lines and a series of gate lines, which are often arranged perpendicularly in a grid across the backplane. Other controllers, or the same controller, will also provide voltages to the top electrode as well as a common voltage ($V_{com}$) provided to a storage capacitor that is typically associated with a given pixel electrode.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

“Gate driver” is a power amplifier that accepts a low-power input from a controller, for instance a microcontroller integrated circuit (IC), and produces a high-current drive input for the gate of a high-power transistor such as a TFT coupled to a pixel electrode. “Source driver” is a power amplifier producing a high-current drive input for the source of a high-power transistor. “Top plane common electrode driver” or “top plane driver” or “top electrode driver” is a power amplifier producing a high-current drive input for the top plane electrode of a display.

“Waveform” denotes the entire voltage against time curve used to actuate a pixel in a microfluidic device. Typically, such a waveform will comprise a plurality of waveform elements, where these elements are essentially rectangular (i.e., where a given element comprises application of a constant voltage for a period of time). The elements may be called “voltage pulses” or “drive pulses”. The term “drive scheme” denotes a set of waveforms sufficient to effect a manipulation of one or more droplets in the course of a specific droplet operation. The term “frame” denotes a single update of all the pixel rows in a microfluidic device.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175, 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating, meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

SUMMARY

Disclosed herein are improved methods of driving full color electrophoretic displays and full color electrophoretic displays using these drive methods. In one aspect, a method of driving an electro-optic display comprising a layer of electro-optic material disposed between a top electrode and a backplane. In the display, the backplane includes an array of pixel electrodes, wherein each pixel electrode is coupled to a thin film transistor (TFT) and a storage capacitor. The TFT includes a source, a gate, and a drain, wherein the gate is coupled to a gate line, the source is coupled to a scan line, and the drain is coupled to the pixel electrode, wherein a controller provides time-dependent voltages to the gate line, the scan line, the top electrode, and the storage capacitor. A first side of the storage capacitor is coupled to the pixel electrode and a second side of the storage capacitor is coupled to the controller. The method of driving includes a) providing a first high voltage to the scan line and a first low voltage to the top electrode and the second side of the storage capacitor, b) providing a first gate pulse sufficient to open the TFT, c) after the first gate pulse, providing a zero voltage to the scan line, the top electrode and the second side of the storage capacitor, d) providing a second gate pulse sufficient to open the TFT, e) after the second gate pulse, providing a second low voltage to the scan line and a second high voltage to the top electrode and the storage capacitor, and f) providing a third gate pulse sufficient to open the TFT.

In one embodiment, steps a)-f) are completed in three subsequent frames. In one embodiment, the top electrode is light-transmissive. In one embodiment, the top electrode and the second side of the storage capacitor are electrically coupled to a common node. In one embodiment, the TFT is fabricated from amorphous silicon. In one embodiment, the first and second high voltages are +15V. In one embodiment, the first and second low voltages are −15V. In one embodiment, the layer of electro-optic material includes an encapsulated electrophoretic medium comprising a plurality of types of charged particles that move between the top electrode and the backplane in response to an applied electric field. In one embodiment, the electrophoretic medium is encapsulated in a plurality of microcapsules or encapsulated in a plurality of sealed microcells. In one embodiment, the encapsulated electrophoretic medium comprises four different types of charged particles.

In another aspect, a method of driving an electro-optic display comprising a layer of electro-optic material disposed between a top electrode and a backplane. In the display, the backplane includes an array of pixel electrodes, wherein each pixel electrode is coupled to a thin film transistor (TFT) and a storage capacitor. The TFT includes a source, a gate, and a drain, wherein the gate is coupled to a gate line, the source is coupled to a scan line, and the drain is coupled to the pixel electrode, wherein a controller provides time-dependent voltages to the gate line, the scan line, the top electrode, and the storage capacitor. A first side of the storage capacitor is coupled to the pixel electrode and a second side of the storage capacitor is coupled to the controller. The method of driving comprises a) providing a first high voltage to the scan line and a first low voltage to the top electrode and the second side of the storage capacitor, b) providing a first gate pulse sufficient to open the TFT, c) after the first gate pulse, providing a second low voltage to the scan line, d) providing a second gate pulse sufficient to open the TFT, e) after the second gate pulse, providing a second high voltage to the top electrode and the second side of the storage capacitor, and f) providing a third gate pulse sufficient to open the TFT.

In one embodiment, steps a)-f) are completed in three subsequent frames. In one embodiment, the top electrode is light-transmissive. In one embodiment, the top electrode and the second side of the storage capacitor are electrically coupled to a common node. In one embodiment, the TFT is fabricated from amorphous silicon. In one embodiment, the first and second high voltages are +15V. In one embodiment, the first and second low voltages are −15V. In one embodiment, the layer of electro-optic material includes an encapsulated electrophoretic medium comprising a plurality of types of charged particles that move between the top electrode and the backplane in response to an applied electric field. In one embodiment, the electrophoretic medium is encapsulated in a plurality of microcapsules or encapsulated in a plurality of sealed microcells. In one embodiment, the encapsulated electrophoretic medium comprises four different types of charged particles.

In another aspect, a method of driving an electro-optic display comprising a layer of electro-optic material disposed between a top electrode and a backplane. In the display, the backplane includes an array of pixel electrodes, wherein each pixel electrode is coupled to a thin film transistor (TFT) and a storage capacitor. The TFT includes a source, a gate, and a drain, wherein the gate is coupled to a gate line, the source is coupled to a scan line, and the drain is coupled to the pixel electrode, wherein a controller provides time-dependent voltages to the gate line, the scan line, the top electrode, and the storage capacitor. A first side of the storage capacitor is coupled to the pixel electrode and a second side of the storage capacitor is coupled to the controller. The method of driving comprises a) providing a first high voltage to the scan line and a first low voltage to the top electrode and the second side of the storage capacitor, b) providing a first gate pulse sufficient to open the TFT, c) after the first gate pulse, providing a second high voltage to the top electrode and the second side of the storage capacitor, d) providing a second gate pulse sufficient to open the TFT, e) after the second gate pulse, providing a second low voltage to the scan line, and f) providing a third gate pulse sufficient to open the TFT.

In one embodiment, steps a)-f) are completed in three subsequent frames. In one embodiment, the top electrode is light-transmissive. In one embodiment, the top electrode and the second side of the storage capacitor are electrically coupled to a common node. In one embodiment, the TFT is fabricated from amorphous silicon. In one embodiment, the first and second high voltages are +15V. In one embodiment, the first and second low voltages are −15V. In one embodiment, the layer of electro-optic material includes an encapsulated electrophoretic medium comprising a plurality of types of charged particles that move between the top electrode and the backplane in response to an applied electric field. In one embodiment, the electrophoretic medium is encapsulated in a plurality of microcapsules or encapsulated in a plurality of sealed microcells. In one embodiment, the encapsulated electrophoretic medium comprises four different types of charged particles.

In another aspect, a method of driving an electro-optic display. The display includes a layer of electro-optic material disposed between a top electrode and a backplane, the backplane including an array of pixel electrodes, wherein each pixel electrode is coupled to a thin film transistor (TFT) and a storage capacitor, the TFT including a source, a gate, and a drain, wherein the gate is coupled to a gate line, the source is coupled to a scan line, and the drain is coupled to the pixel electrode, wherein the controller provides time-dependent voltages to the gate line, the scan line, and the top electrode. The electro-optic display is configured to execute the following steps (in order): (a) provide a first voltage to the top electrode, (b) provide a specific voltage to each electrode of the array of pixel electrodes in a first sequential order, wherein at least 10 pixels of the array have specific voltages different from the majority of the pixel electrodes, (c) provide a specific voltage to each electrode of the array of pixel electrodes in a second sequential order, wherein the order of providing specific voltages to pixel electrodes in the second sequential order is a reverse order of the first sequential order, and wherein each pixel receives the same specific voltage in both the first sequential order and the second sequential order, and (d) provide a second voltage different from the first voltage to the top electrode. The pixel electrodes do not receive another voltage from the controller between steps (b) and (c). In one embodiment, the TFT is fabricated from amorphous silicon. In one embodiment, the top electrode is light-transmissive. In one embodiment, the first voltage is +15V and the second voltage is −15V. In one embodiment, the first voltage is −15V and the second voltage is +15V. In one embodiment, at least 100 pixels of the array have specific voltages different from the majority of the pixel electrodes. In one embodiment, the layer of electro-optic material includes an encapsulated electrophoretic medium comprising a plurality of types of charged particles that move between the top electrode and the backplane in response to an applied electric field. In one embodiment, the electrophoretic medium is encapsulated in a plurality of microcapsules or encapsulated in a plurality of sealed microcells. In one embodiment, the encapsulated electrophoretic medium comprises four different types of charged particles.

DETAILED DESCRIPTION

The invention provides improved methods of driving electro-optic media devices with so-called top-plane switching, i.e., where the voltage on the top electrode is varied during the course of a device update. In some embodiments, the invention is used with an electrophoretic medium including four particles wherein two of the particles are colored and subtractive and at least one of the particles is scattering. Typically, such a system includes a white particle and cyan, yellow, and magenta subtractive primary colored particles.

Figure 5:
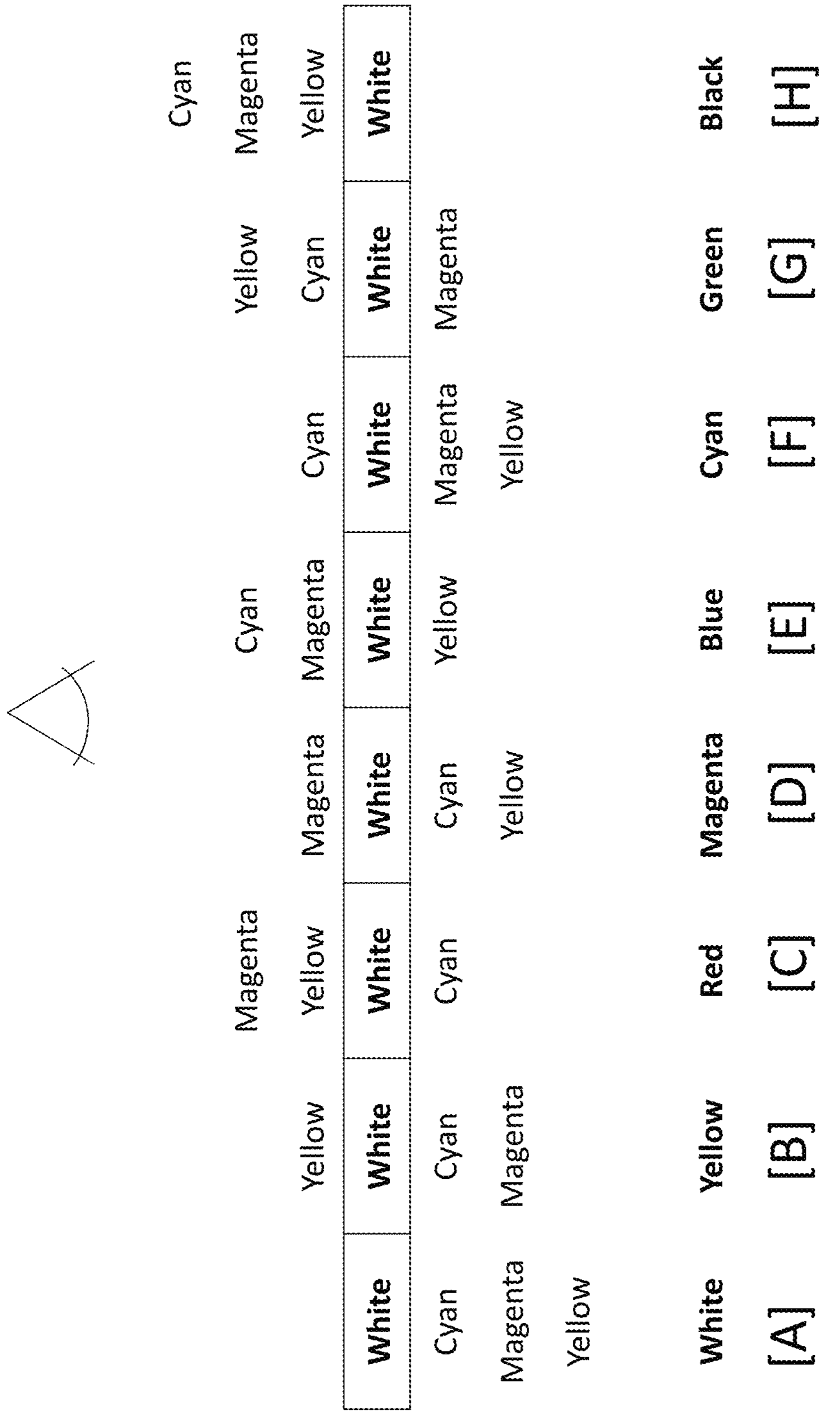
FIG. 5 is a diagrammatic view showing the positions of the white, cyan, yellow, and magenta particles in an electrophoretic medium when displaying black, white, the three subtractive primary colors (yellow, magenta, and cyan) and the three additive primary colors (red, blue, and green).

Such a system is shown schematically in FIG. 5, and it can provide white, yellow, red, magenta, blue, cyan, green, and black at every pixel.

A display device may be constructed using an electrophoretic fluid of the invention in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 1:
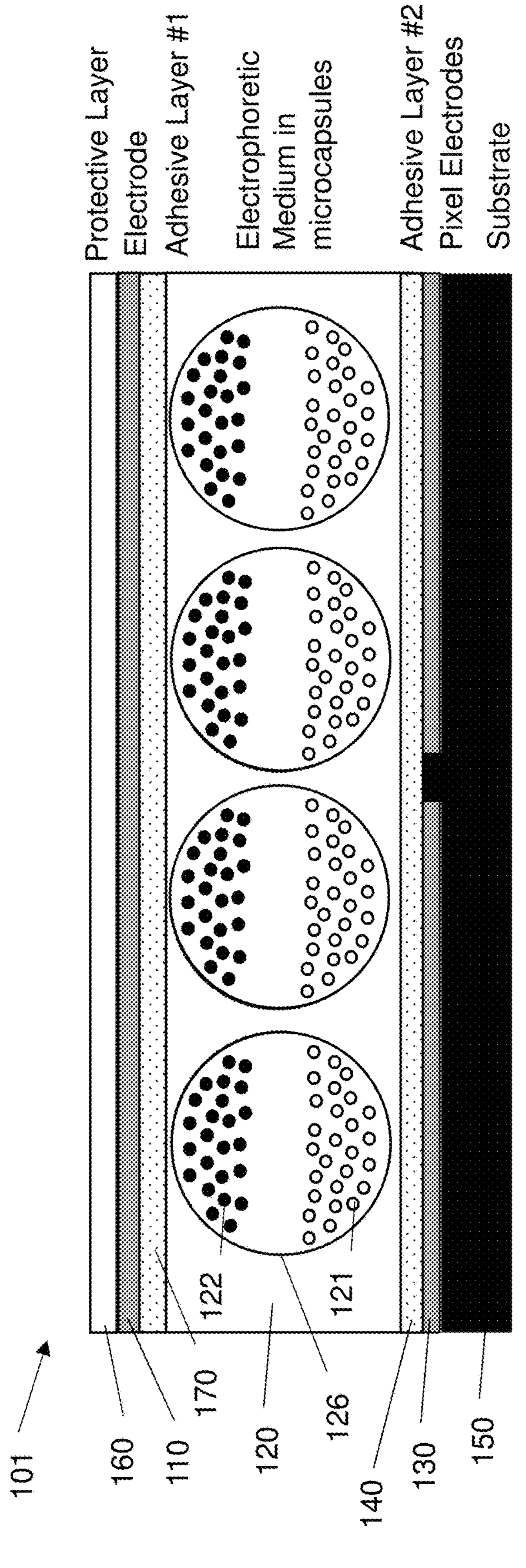
FIG. 1 is a schematic cross-section showing an embodiment of an encapsulated electrophoretic display suitable for use with the methods of the invention.
Figure 2:
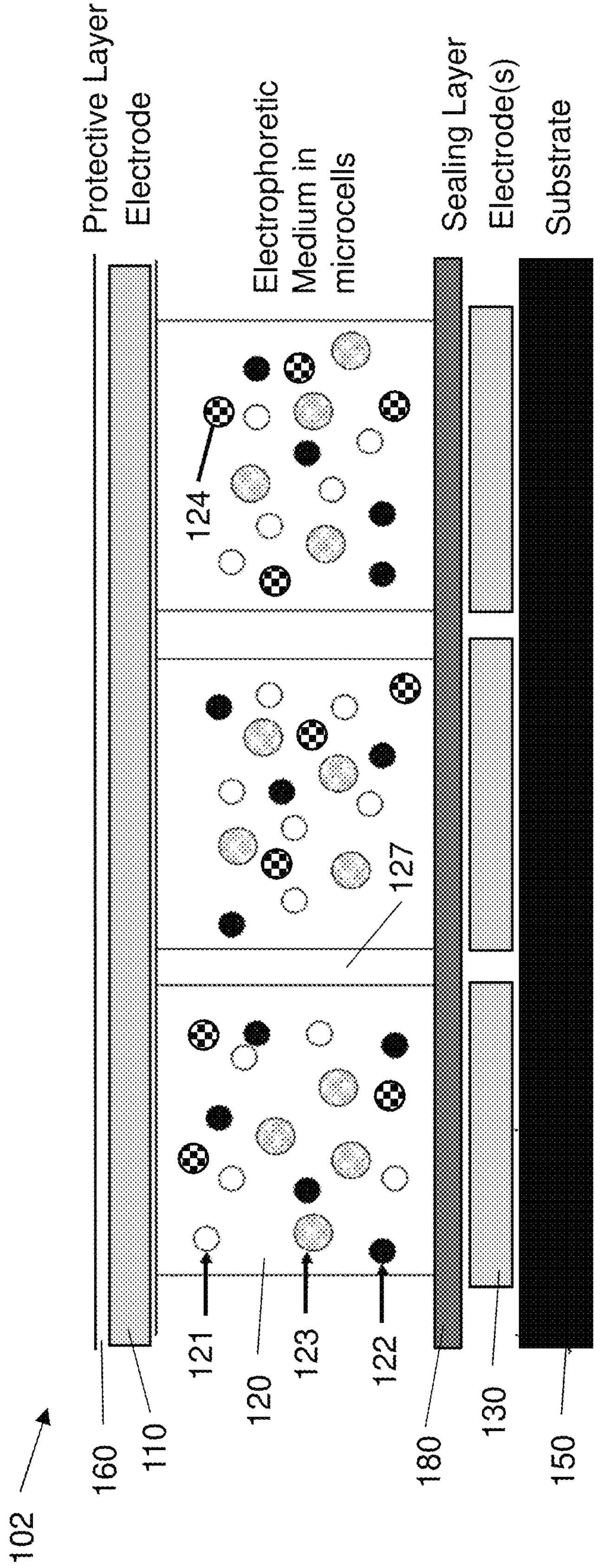
FIG. 2 is a schematic cross-section showing an embodiment of an encapsulated electrophoretic display suitable for use with the methods of the invention.

Regarding FIGS. 1 and 2, an electrophoretic display (101, 102) typically includes a top transparent electrode 110, an electrophoretic medium 120, and a bottom electrode 130, which is often a pixel electrode of an active matrix of pixels controlled with thin film transistors (TFT), discussed in greater detail below. The electrophoretic medium 120 contains at least one electrophoretic particle 121, however a second electrophoretic particle 122, or a third electrophoretic particle 123, a fourth electrophoretic particle 124, or more particles is feasible. The electrophoretic medium 120 typically includes a solvent, such as isoparaffins, and may also include dispersed polymers and charge control agents to facilitate state stability, e.g. bistability, i.e., the ability to maintain an electro-optic state without inputting any additional energy.

The electrophoretic medium 120 is typically compartmentalized such by a microcapsule 126 or the walls of a microcell 127. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include one or more adhesive layers 140, 170, and/or sealing layers 180 as needed. In some embodiments an adhesive layer may include a primer component to improve adhesion to the electrode layer 110, or a separate primer layer (not shown in FIG. 1 or 2) may be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088, and 7,839,564, all of which are incorporated by reference herein in their entireties.

Amorphous silicon TFT backplanes usually have only one transistor per pixel electrode or propulsion electrode. As illustrated in in FIG. 3, each transistor (TFT) is connected to a gate line, a data line, and a pixel electrode (propulsion electrode). When there is large enough positive voltage on the TFT gate (or negative depending upon the type of transistor) then there is low impedance between the scan line and pixel electrode coupled to the TFT drain (i.e., Vg "ON" or "OPEN" state), so the voltage on the scan line is transferred to the electrode of the pixel. When there is a negative voltage on the TFT gate, however, then there is high impedance and voltage is stored on the pixel storage capacitor and not affected by the voltage on the scan line as the other pixels are addressed (i.e., Vg "OFF" or "CLOSED"). Thus, ideally, the TFT should act as a digital switch. In practice, there is still a certain amount of resistance when the TFT is in the "ON" setting, so the pixel takes some time to charge. Additionally, voltage can leak from $V_S$ to $V_{pix}$ when the TFT is in the "OFF" setting, causing cross-talk.

Figure 3:
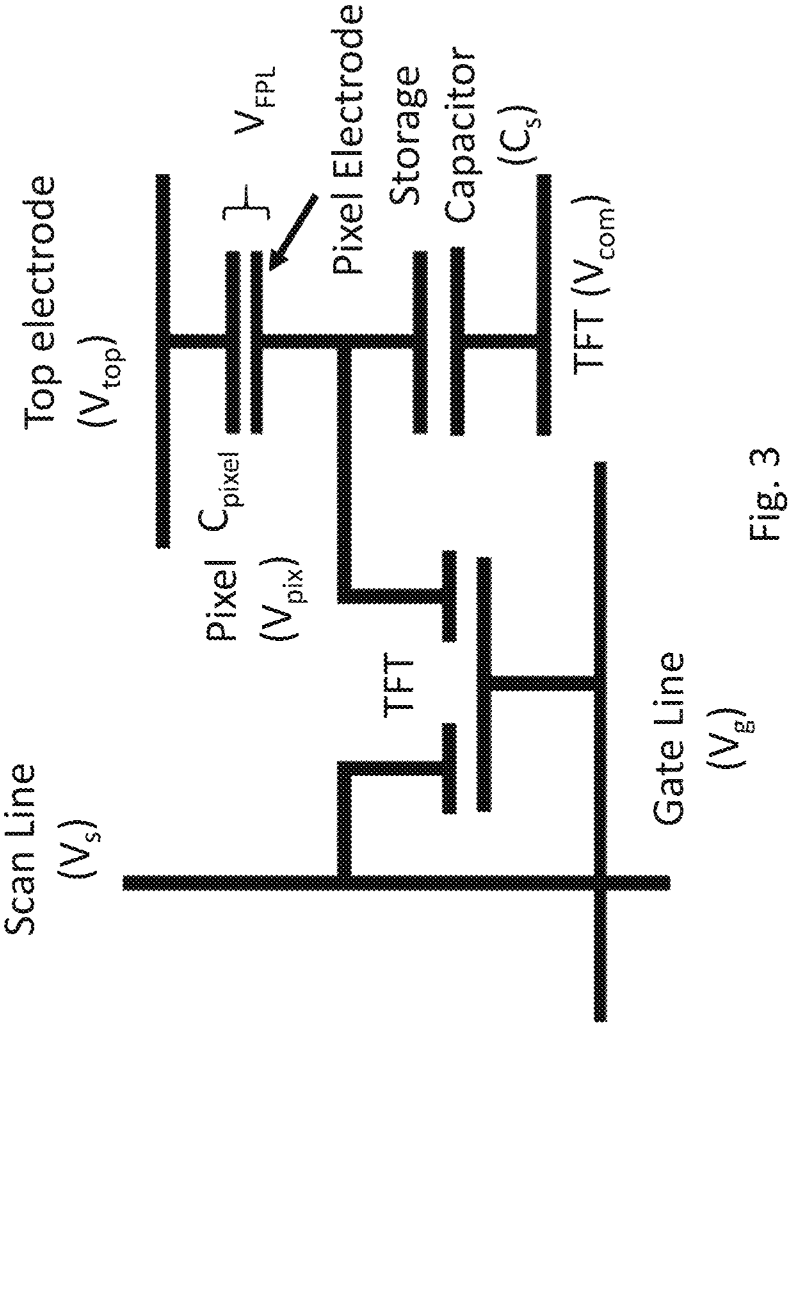
FIG. 3 illustrates an exemplary equivalent circuit of a single pixel of an electrophoretic display.

Increasing the capacitance of the storage capacitor $C_s$ reduces cross-talk, but at the cost of rendering the pixels harder to charge, and increasing the charge time. As shown in FIG. 3, a separate voltage ($V_{TOP}$) is provided to the top electrode, thus establishing an electric field between the top electrode and the pixel electrode ($V_{FPL}$). Ultimately, it is the value of $V_{FPL}$ that determines the optical state of the relevant electro-optic medium. While a first side of the storage capacitor is coupled to the pixel electrode, a second side of the storage capacitor is coupled to a separate line ($V_{COM}$) that allows the charge to be removed from the pixel electrode. See, for example, U.S. Pat. No. 7,176,880, which is incorporated by reference in its entirety. [In some embodiments, N-type semiconductor (e.g., amorphous silicon) may be used to from the transistors and the "select" and "non-select" voltages applied to the gate electrodes can be positive and negative, respectively.] In some embodiments $V_{COM}$ may be grounded, however there are many different designs for draining charge from the charge capacitor, e.g., as described in U.S. Pat. No. 10,037,735, which is incorporated by reference in its entirety.

Most commercial electrophoretic displays use amorphous silicon based thin-film transistors (TFTs) in the construction of active matrix backplanes (See FIG. 4) because of the wider availability of fabrication facilities and the costs of the various starting materials. Unfortunately, amorphous silicon thin-film transistors become unstable when supplied gate voltages that would allow switching of voltages higher than about +/−15V. Nonetheless, as described below, the performance of ACeP is improved when the magnitudes of the high positive and negative voltages are allowed to exceed +/−15V Accordingly, as described in previous disclosures, improved performance is achieved by additionally changing the bias of the top light-transmissive electrode with respect to the bias on the backplane pixel electrodes, also known as top-plane switching. Thus, if a voltage of +30V (relative to the backplane) is needed, the top plane may be switched to −15V while the appropriate backplane pixel is switched to +15V Methods for driving a four-particle electrophoretic system with top-plane switching are described in greater detail in, for example, U.S. Pat. No. 9,921,451.

Figure 4:
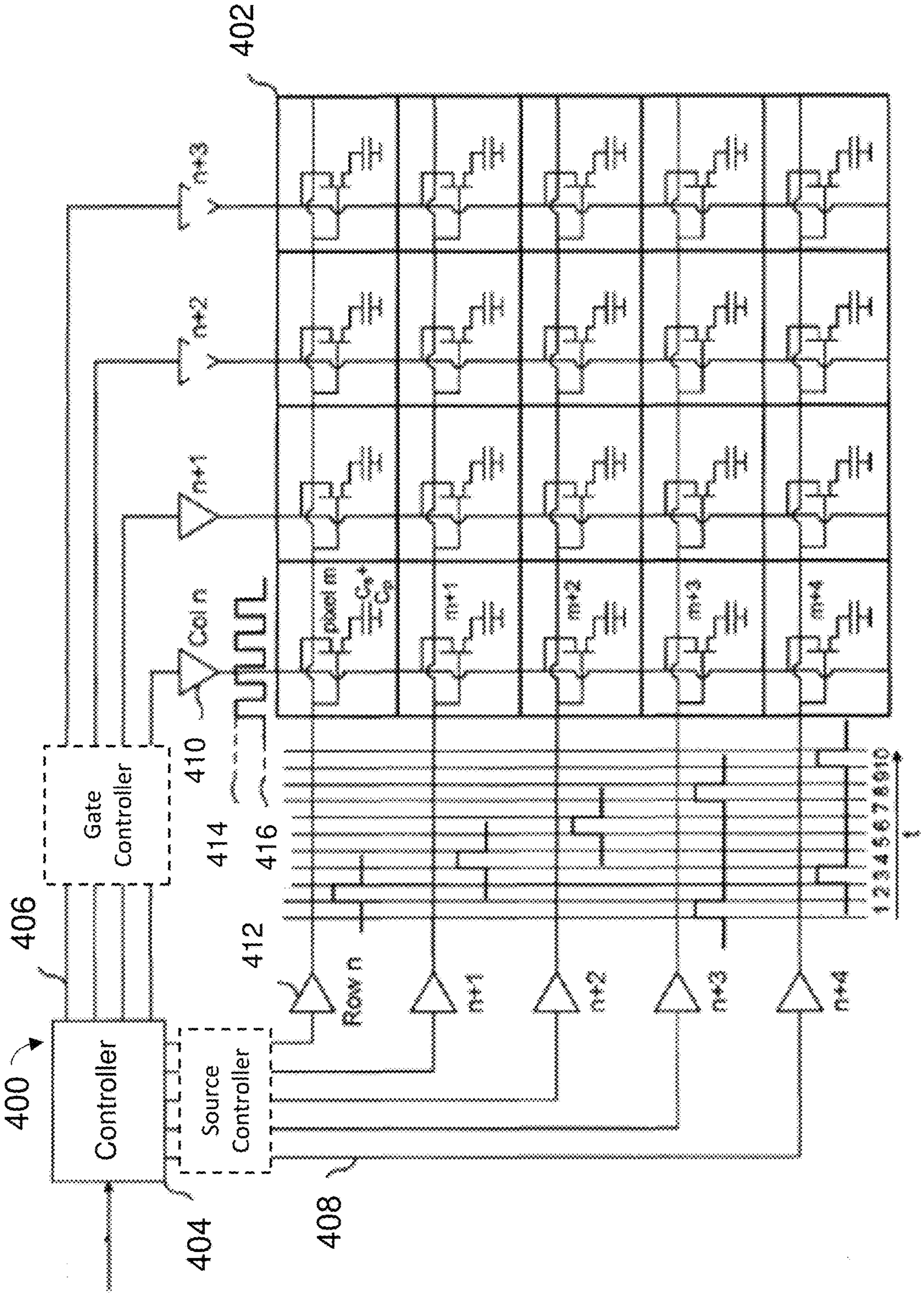
FIG. 4 is a diagrammatic view of an exemplary driving system for controlling voltages on pixel electrodes in an active matrix device. The resulting voltages can be used to set an optical state of an electro-optic medium.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an active matrix display 400, shown in FIG. 4. An addressing or pixel electrode, which addresses one pixel, is fabricated on a substrate 402 and connected to an appropriate voltage source 406 through the associated non-linear element. It is to be understood that FIG. 4 is an illustration of the layout of an active matrix backplane 400 but that, in reality, the active matrix has depth and some elements, e.g., the TFT, may actually be underneath the pixel electrode, with a via providing an electrical connection from the drain to the pixel electrode above.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 406, while the gates of all the transistors in each row are connected to a single row (gate) line 408; again the assignment of sources to rows and gates to columns is conventional but essentially arbitrary, and could be reversed if desired. The gate lines 408 are connected to a gate line driver 412, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 406 are connected to scan line drivers 410, which place upon the various scan lines 406 voltages selected to drive the pixels in the selected row to their desired optical states. (The aforementioned voltages are relative to a common top electrode, and is not shown in FIG. 4.) After a pre-selected interval known as the "line address time" the selected row is deselected, the next row is selected, and the voltages on the column drivers are changed so that the next line of the display is written. This process is repeated so that the entire display is written in a row-by-row manner. More details of this row-by-row driving are discussed below.

Thus, as described above, it is possible to increase the active field above a pixel electrode using top plane switching. In the instance of ACeP®, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). This is shown in FIG. 5. It has been found that waveforms to sort the four pigments into appropriate configurations to make these colors require at least five voltage levels (high positive, low positive, zero, low negative, high negative). See FIG. 6. To achieve the wider range of colors, additional voltage levels must be used for finer control of the pigments. Thus, the invention provides several improved ways to drive such an electrophoretic medium so that they refreshes of pixel colors are faster, less flashy, and result in a color spectrum that is more pleasing to the viewer.

Figure 6:
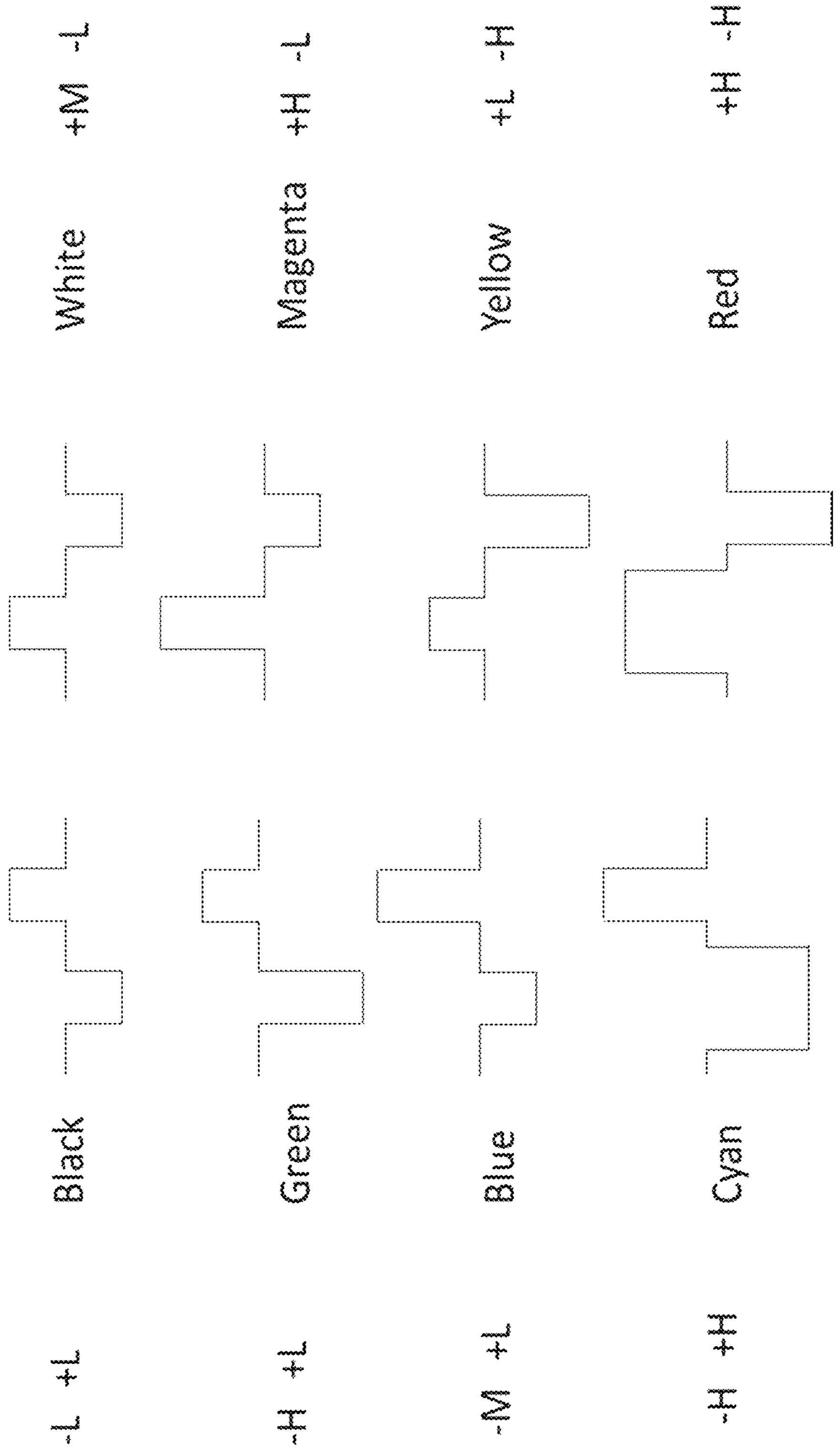
FIG. 6 shows exemplary push-pull drive schemes for addressing an electrophoretic medium including three subtractive particles and a scattering (white) particle.

For example, in U.S. Pat. No. 9,921,451, seven different voltages are applied to each pixel electrode to facilitate a full palette of colors at each individual pixel electrodes: three positive, three negative, and zero. Typically, the maximum voltages used in these waveforms are higher than that can be handled by amorphous silicon thin-film transistors, without top plane switching however. FIG. 6 shows typical waveforms (in simplified form) used to drive a four-particle color electrophoretic display system described above. Such waveforms have a "push-pull" structure: i.e., they consist of a dipole comprising two pulses of opposite polarity. The magnitudes and lengths of these pulses determine the color obtained. At a minimum, there should be five such voltage levels. FIG. 6 shows high and low positive and negative voltages, as well as zero volts. Typically, "low" (L) refers to a range of about five-15V, while "high" (H) refers to a range of about 15-30V In general, the higher the magnitude of the "high" voltages, the better the color gamut achieved by the display. The "medium" (M) level is typically around 15V; however, the value for M will depend somewhat on the composition of the particles, as well as the environment of the electrophoretic medium.

Figure 7:
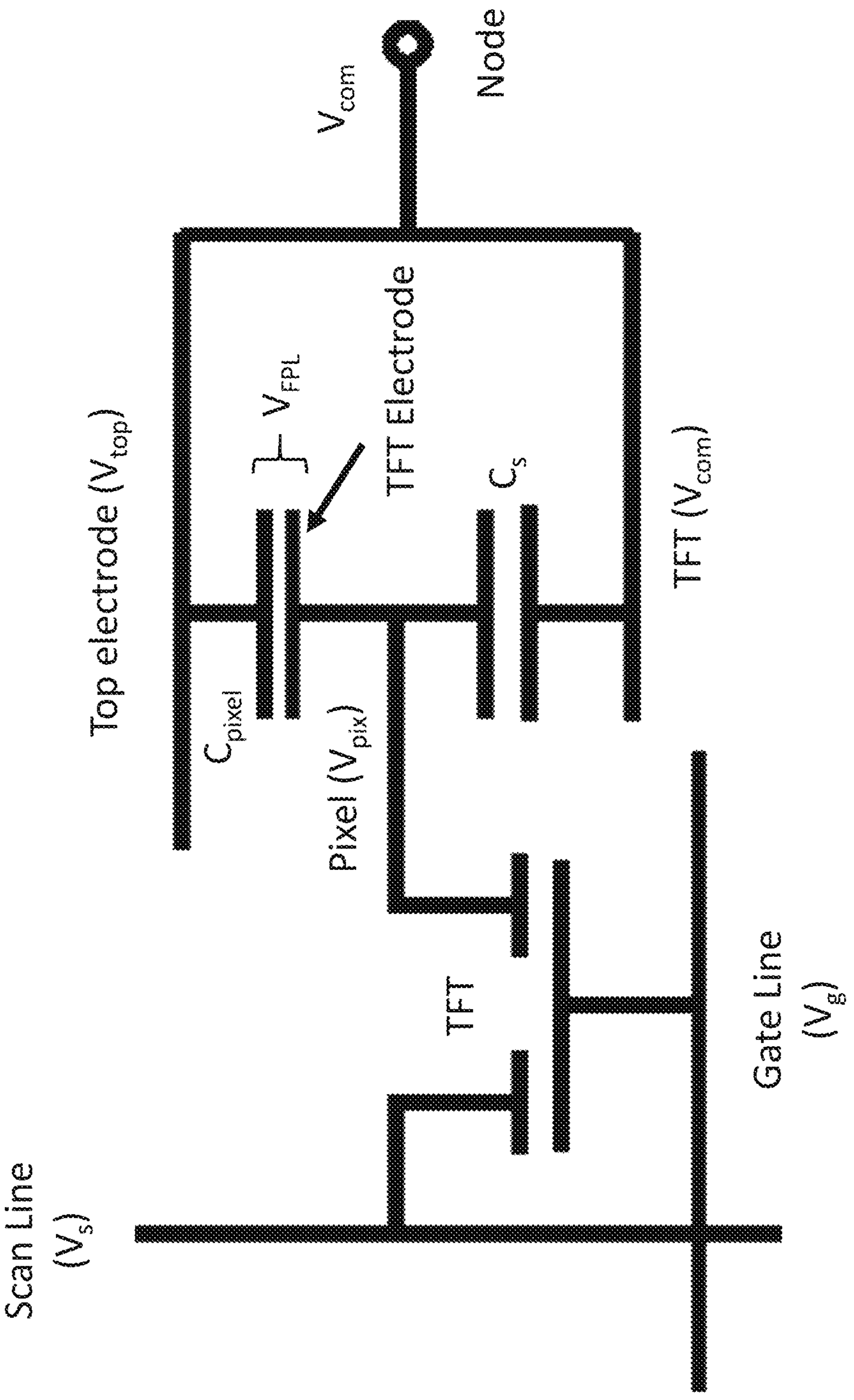
FIG. 7 illustrates an exemplary equivalent circuit of a single pixel when the storage capacitor ($V_{com}$) and the top electrode ($V_{top}$) are tied together (both $V_{com}$).

An obvious issue with top plane switching is that when the top plane is switched from a first state, e.g., −15V to a second state +15V the electro-optic medium or droplets between the top plane and the pixel electrode (i.e., $V_{FPL}$) will experience a huge swing in electric field, which may result in the pixel not achieving the correct impulse during that frame. Thus, if $V_{TOP}$ is changed and $V_{COM}$ is not compensated, a pixel may not achieve the correct color, or a droplet may not move as quickly as is anticipated. To overcome this dramatic shift, the $V_{COM}$ and $V_{TOP}$ lines are typically tied together, e.g., through a common node, as shown in FIG. 7, so that when the gate is opened, the relative change in $V_{FPL}$ is maintained as expected.

Nonetheless, as explained in FIGS. 8A-8D and 9, tying together $V_{TOP}$ and $V_{COM}$ does not solve the problems completely. First, for particular voltage combinations and for particular pixels in an array, the pixel electrode and TFT materials can undergo electric fields that are outside of the normal operational boundaries. This may cause current leakage through the transistor which results in unwanted optical states/droplet driving and/or drives electrochemical reactions between the pixel electrode materials and the surrounds, which are typically actually grounded (or close to). Additionally, when the devices include layers of adhesives with conductive materials, the instantaneous high voltages can (rarely) create shorts through the conductive materials with a path to ground.

Figure 8A:
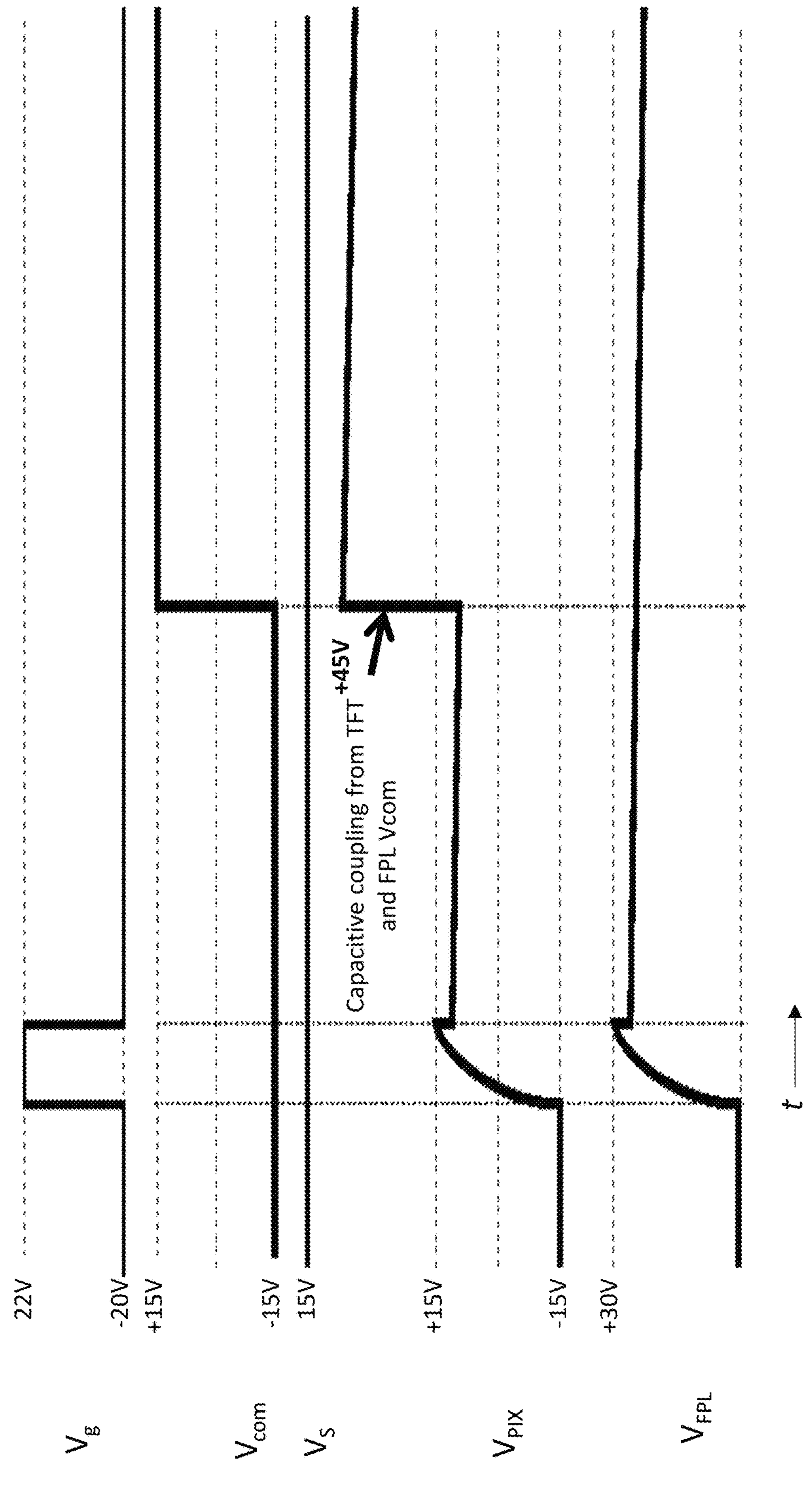
FIG. 8A illustrates the voltage "seen" by a pixel electrode when top plane switching is used without intervening zero frames. Note that the time axis for FIG. 8A is much shorter than FIG. 10A or 11A.

As shown in FIG. 8A, when the voltage on the medium is −30V, but intended to be switched to 30V, a scan line delivers a voltage of +15V, while the $V_{COM}$ line, which is also $V_{TOP}$, receives a voltage of −15V When the gate of the TFT is opened with a high positive pulse, the pixel electrode "sees" +15V from the scan line, and the medium "sees" +30V. However, before the gate is opened a second time the top plane (i.e., $V_{COM}$) is switched again. This typically happens when the pixel in question in in the lower right-hand corner of the array, as described in FIGS. 8B-8D, below. When $V_{COM}$ goes from −15V to +15V, however, the pixel electrode jumps 30V in absolute value relative to its surrounds to +45V, even though the voltage relative to the top plane remains the same. Functionally, this spike in voltage on the pixel electrode is due to the capacitive coupling between the TFT and $V_{COM}$. Such a spike can damage the TFT and or the pixel electrode. While not shown in FIG. 8A, it is also possible to achieve $V_{PIX}$ of −45V when the pixel and top plane are addressed in the reverse order.

Figure 8B:
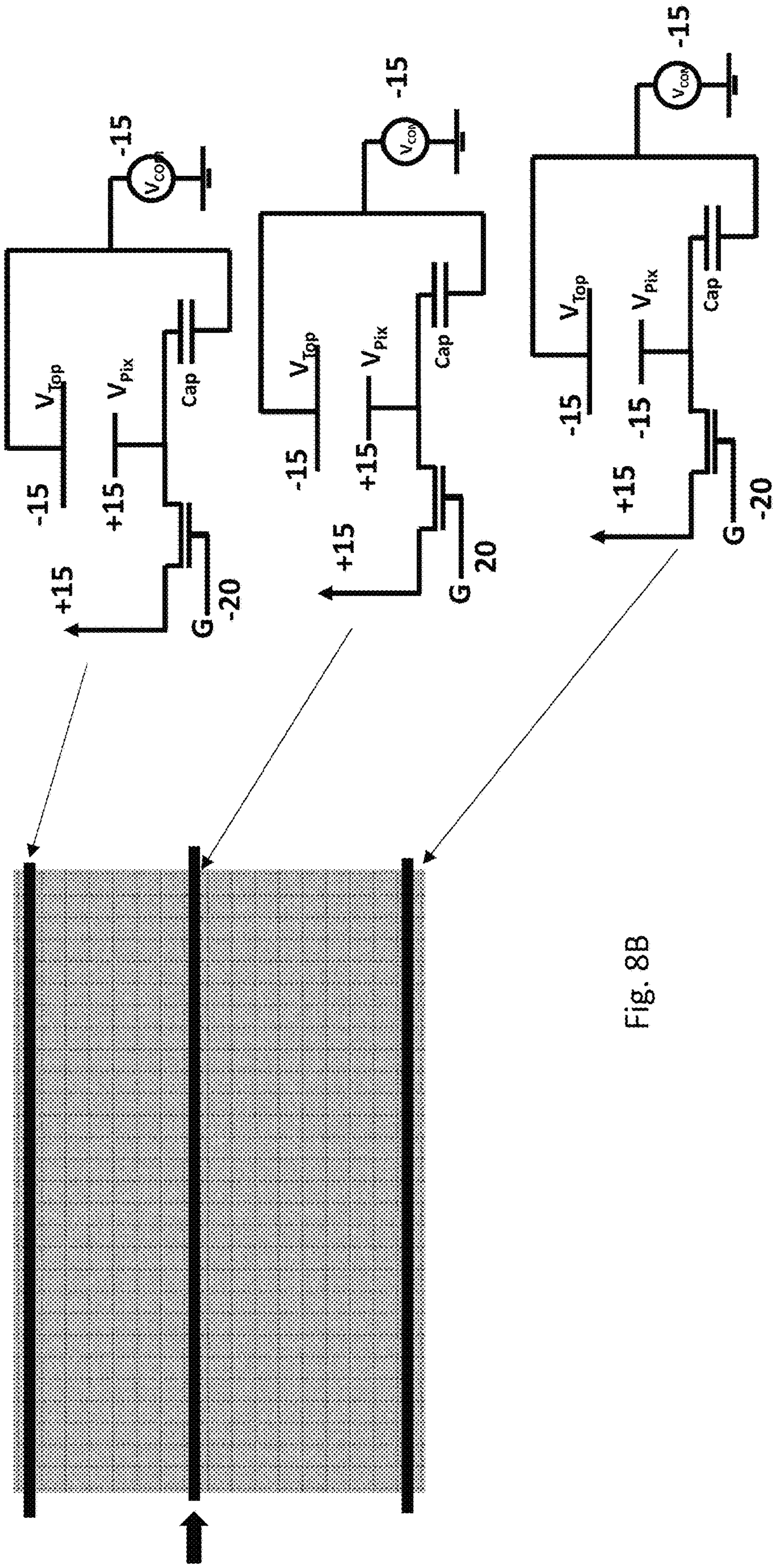
FIG. 8B illustrates the voltages at various points in exemplary equivalent circuit of three different pixels driven as shown in FIG. 8A. The gate of the top pixel has already opened and closed while $V_{com}$ is at −15V. The gate of the middle pixel is currently open while $V_{com}$ is at −15V The gate of the bottom pixel has not yet opened while $V_{com}$ is at −15V.
Figure 8C:
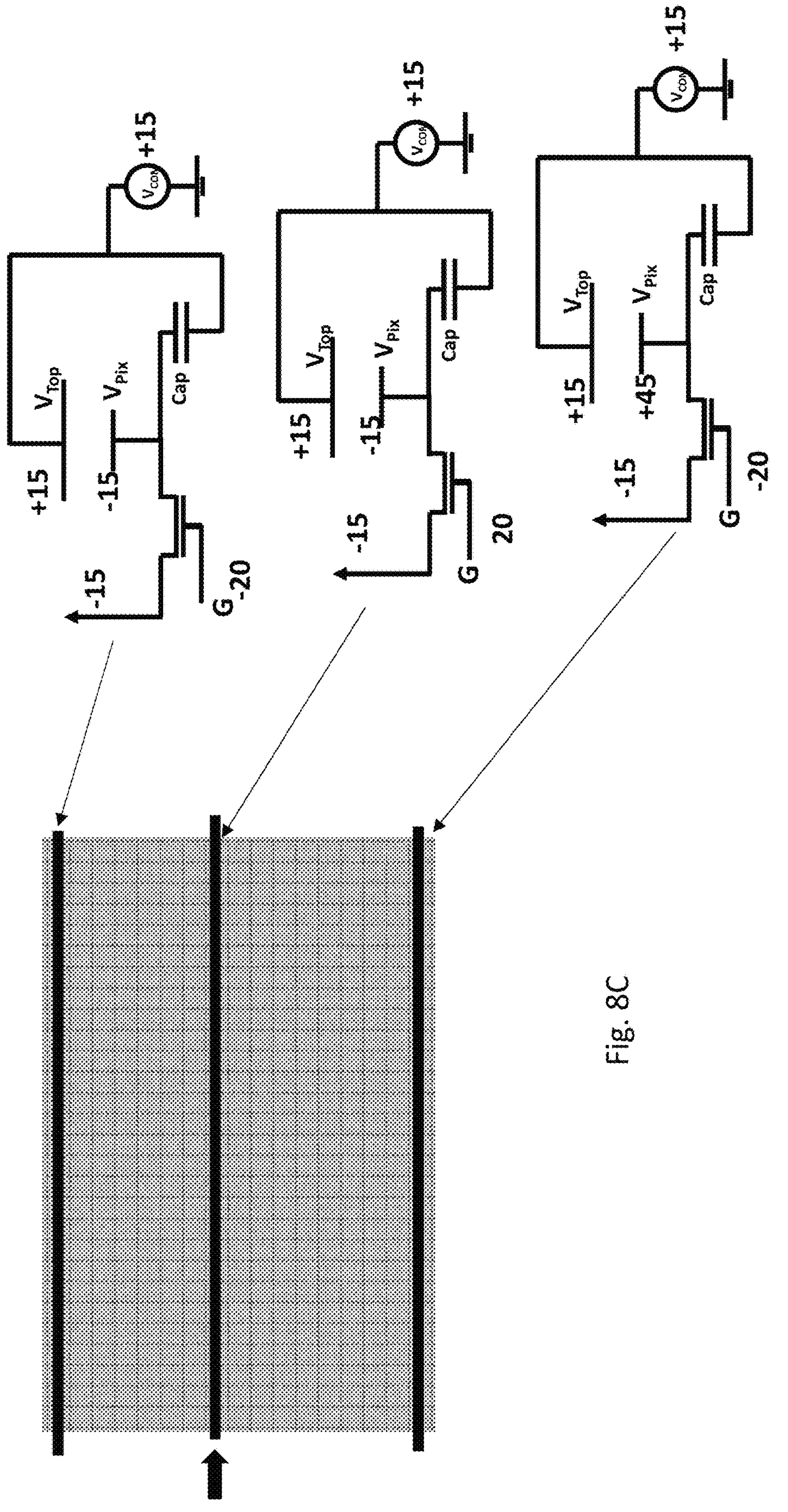
FIG. 8C illustrates the voltages at various points in exemplary equivalent circuit of a three different pixels driven as shown in FIG. 8A. The gate of the top pixel has already opened and closed while $V_{com}$ is at +15V. The gate of the middle pixel is currently open while $V_{com}$ is at +15V. The gate of the bottom pixel has not yet opened while $V_{com}$ is at +15V. Because of the short amount of time since the gate of the bottom pixel was opened, the voltage "seen" by the pixel electrode in the bottom pixel is actually quite high ~45V.
Figure 8D:
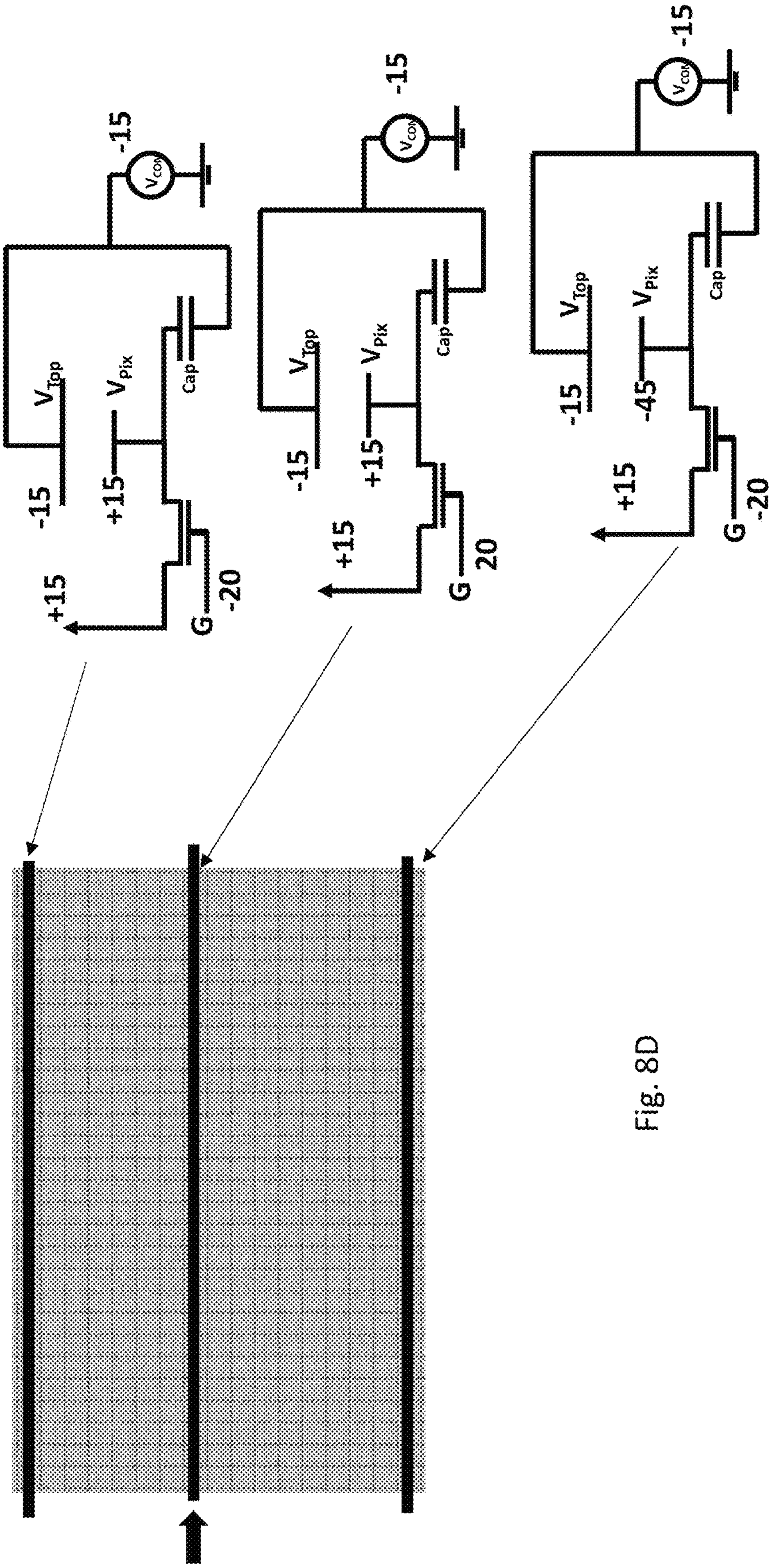
FIG. 8D illustrates the voltages at various points in exemplary equivalent circuit of a three different pixels after driving as in FIG. 8A and attempting to return to the initial state of $V_{com}$=−15V. The gate of the top pixel has already opened and closed while $V_{com}$ is at −15V. The gate of the middle pixel is currently open while $V_{com}$ is at −15V. The gate of the bottom pixel has not yet opened while $V_{com}$ is at −15V. Because of the short amount of time since the gate of the bottom pixel was opened, the voltage "seen" by the pixel electrode in the bottom pixel is actually quite low ~−45V.

The location-dependent effects of top plane switching are further detailed in FIGS. 8B-8D. In particular, because the top electrode is not pixelated (i.e., it is a single electrode), it is not possible to independently switch the top electrode voltage above each pixel in a coordinated way. In general, when row-by-row, top-to-bottom switching is used, as is standard in AM-TFT driving, the top row will typically be switched (i.e., the gate opened) immediately after the top electrode voltage is changed. This is shown in FIG. 8B. At some later time after the top row is addressed, subsequent rows are addressed, as indicated by the arrow in FIG. 8B. However, especially for large arrays, there is sufficient time for the $V_{COM}$ voltage to capacitively-couple through the storage capacitor and pull $V_{PIX}$ to $V_{COM}$. When the last row of pixels are updated, however, the pixel electrode will jump from −15V (pulled down by $V_{COM}$) to +15V when the gate is opened ($\Delta V$=30V) and then once the next frame starts, $V_{COM}$ adds an additional +15V for a total boost of 45V with respect to ground. See 8C. While the medium voltage across all pixels is roughly correct for all of the pixels in the array, a good portion of the pixels see large swings in absolute voltage. Of course, this process can work in reverse to pull the absolute voltage of a pixel very negative, as shown in FIG. 8D.

Figure 9A:
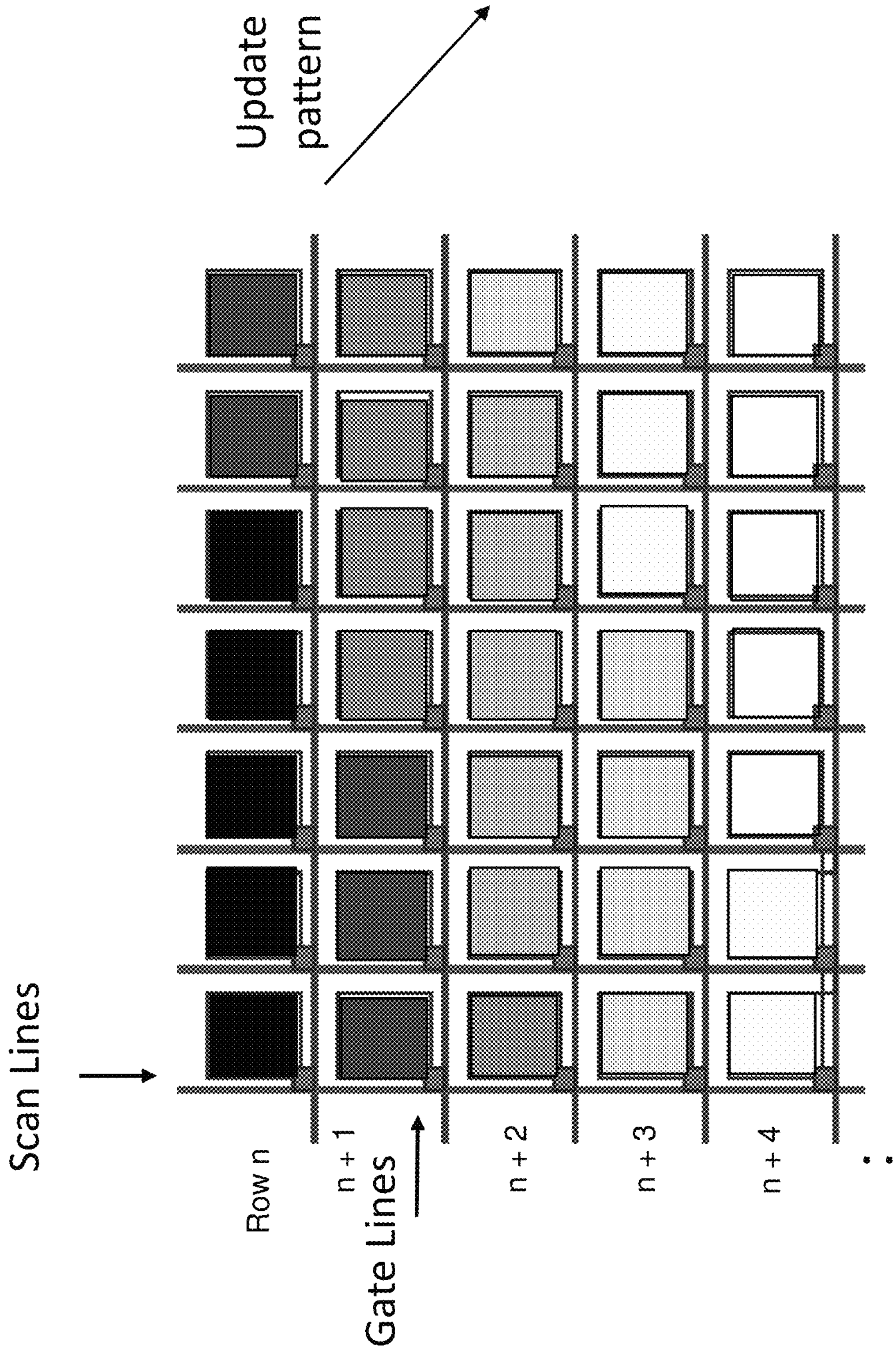
FIG. 9A illustrates a typical "left to right, top to bottom" scan pathway used with active matrix backplanes. When this pathway is used (alone) with top plane switching, the impulse (voltage×time) experienced by a given pixel is position dependent, when the pixels are driven in a row-by-row fashion. As a result, the material adjacent the pixel electrodes (e.g., electrophoretic medium or electrowetting droplets) will experience a position-dependent environment.

A second problem that is observed with top plane switching for larger area active matrix switching is that, even though the voltage between the pixel electrode and the top electrode is “correct” for much of the frame, the total impulse (voltage×time), which ultimately determines the response of e.g., the electro-optic medium or the droplet is not the same between the pixels in the first row of the array and the pixels in the last row of the array. This phenomenon is illustrated in FIG. 9A, where the correct “state” is represented by black and the incorrect state is white. While it is an exaggeration to show that the top left-hand corner is switched to the correct state while the lower right-hand corner is not switched at all in a single frame, it is not an exaggeration to say that during the course of a long update, having a traditional “left to right, top to bottom” scan pathway, the cumulative slippage of the impulses can have undesired consequences. This problem is especially acute for applications such as electrophoretic displays wherein the storage capacitors at the upper right of FIG. 9A benefit from the extra time for charging (or discharging) as the correct voltage. For example, when a 22" diagonal ACeP® device is produced, and the display is switched to a single color using a long driving waveform incorporating top plane switching, a trained eye can detect the difference in the final color between the top row of electrodes and the bottom row of electrodes.

In a typical system, as illustrated in FIG. 9A, the first gate line, n, of m total lines that is addressed works the best of any line, and every line after that works decreasingly well. The last group of addressed gate lines, i.e., row m, performs poorly because after the last gate line is addressed, the top plate voltage is switched to a new different voltage. When the top plate is switched to a new voltage, the storage capacitor of last pixel addressed has had the least time to apply its charge to the pixel undisturbed in the case of the last pixel only one line scan time. The first pixel, by contrast, has had a full m number of line scan times to transfer charge undisturbed. As the number of gate lines m gets larger, the non-uniformity gets worse.

One straightforward solution to this shortcoming is to change the pattern of addressing the gate lines to help alleviate this non-uniformity, thereby creating a “superframe” of driving that involves more than one scan of each gate lines for each voltage and more than one pattern of addressing the lines to aid uniformity. Of course, adding additional update pathing between top plane updates increases the length of each frame. Nonetheless, in many applications, the extra time is acceptable to avoid under-switching some of the pixels, as described above.

Figure 9B:
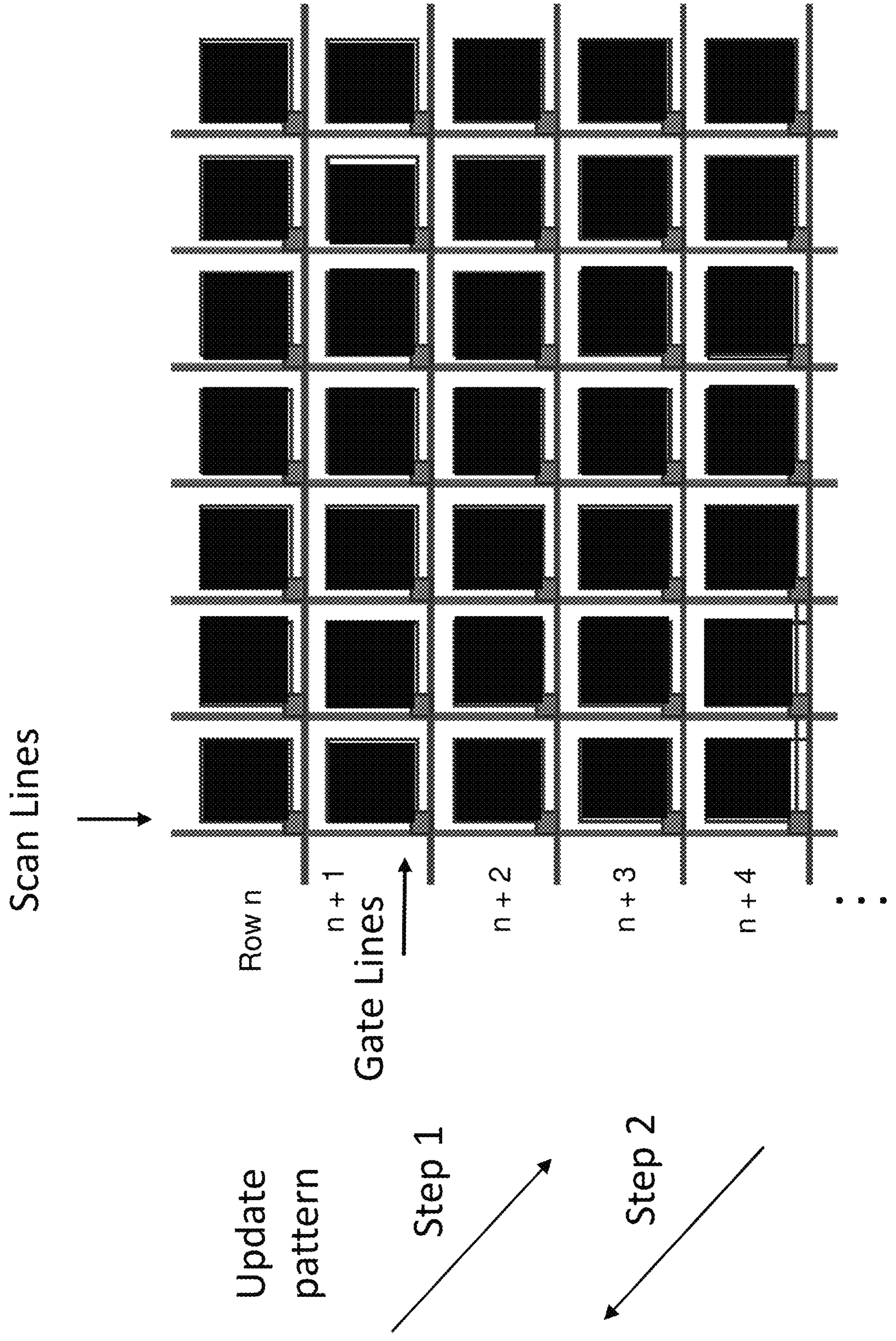
FIG. 9B illustrates that using a two-step, "left to right, top to bottom" scan pathway combined with a supplemental "right to left, bottom to top" scan pathway results in an array of pixels having an electric field environment with less positional variation.

In one embodiment of the invention, the “superframe” involves a first frame where the gate lines start at the first line n and proceeds in the normal mode of operation iterating one at a time n+1, n+2 etc to the last line n=m where m is the number of gate lines. In the second frame of the superframe, the mth gate line is the first line addressed and the gate driver iterates in reverse starting at m, to m−1, m−2, and ending with n, the first line. In other words, the update involves two steps. A first step is to scan in the traditional “left to right, top to bottom” scan pathway. The second step is to scan in reverse, i.e., “right to left, bottom to top.” By having this arrangement where the iteration goes through the gate lines forward and then backwards before the top plane voltage is changed the uniformity of top plane switching of the panel is dramatically increased. An exemplary two step pathway is illustrated in FIG. 9B, however other pathways, such as “left to right, bottom to top” will also work, and may be easier for the controller to process. Regardless, the last row gets the first charge injection to the storage capacitor at the end of the first frame but gets a second charge injection at the beginning of the second frame. This moves all of the pixels much closer to balanced for the amount of charge over time on each pixel, as depicted in FIG. 9B.

The invention exemplified in FIG. 9B is compatible with currently available commercial gate drivers, as well as “all in one” scan/gate drivers. For example, the TFT gate driver of the EK72601 chip (E Ink Corporation) has a selection for scanning direction 1-825 or 825-1. For purposes of this example gate line 1 will be called the top and line 825 or highest number will be the referred to as the bottom. The gate driving superframe would go as follows, set the top plane to +15V or −15V depending on whether the + or − high voltage potential is requested, a gate scan pulse initiates the scanning of the gate lines one at a time, then the initial gate scan would proceed and scan through the gate lines in order 1-825 or less depending on the size of the array. Then the select for the direction of the gate scan would be changed and a second gate start pulse signal would begin a second scan of the gate lines, this time reversed direction from line 825-1 or for the 5.61" panel from 504-1. Only after scanning the gates from top to bottom and bottom to top would the top plane voltage then be changed to continue through additional pulses of the drive sequences.

In advanced embodiments, the performance shortcomings and risks to damage can be alleviated by inserting “rest” or “zero” frames between top plane switches. The zero frames may actually take VCOM and VS to 0V, or some nominal voltage value, or VCOM can be matched to VS for one frame or VS can be matched to VCOM for one frame. The idea is that as the top plane voltage changes, it is possible to prevent large voltage spikes on as yet un-scanned pixels, which could cause those pixels to leak and/or lose their charge and/or fail. In some embodiments, the best results are found when a single frame is inserted where all of the scan lines are fed the identical voltage as the last top electrode voltage and all of the TFTs are gated once. In some embodiments, all of the gates may be opened simultaneously or nearly simultaneously. Of course, adding additional frames to an optical waveform or an electrowetting drive protocol increase the time to complete the task.

Figure 10A:
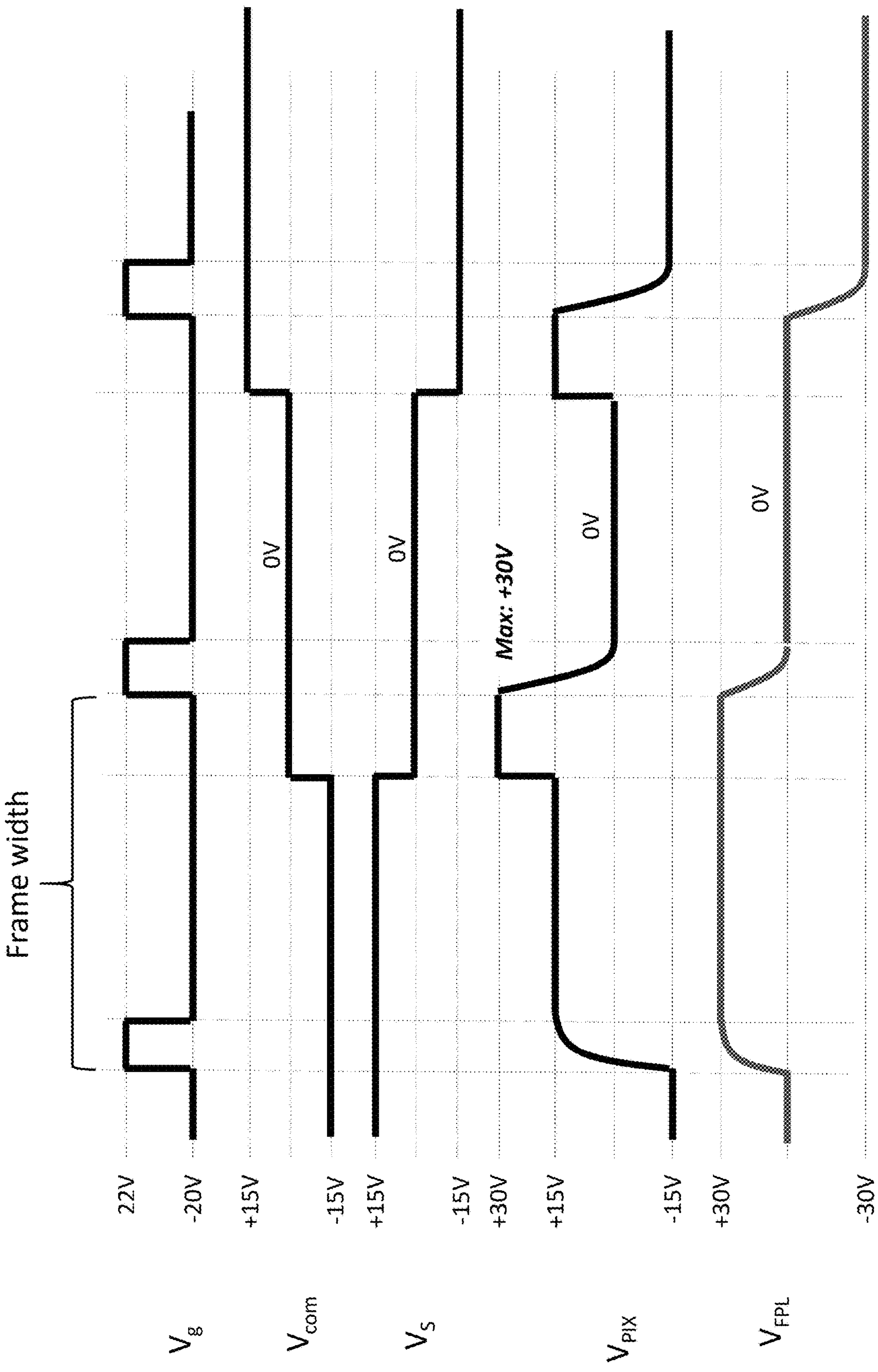
FIG. 10A illustrates the voltage "seen" by a pixel electrode when top plane switching is used but $V_{com}$ and $V_S$ are returned to zero volts for a frame between switching the top plane from low voltage to high voltage.
Figure 10B:
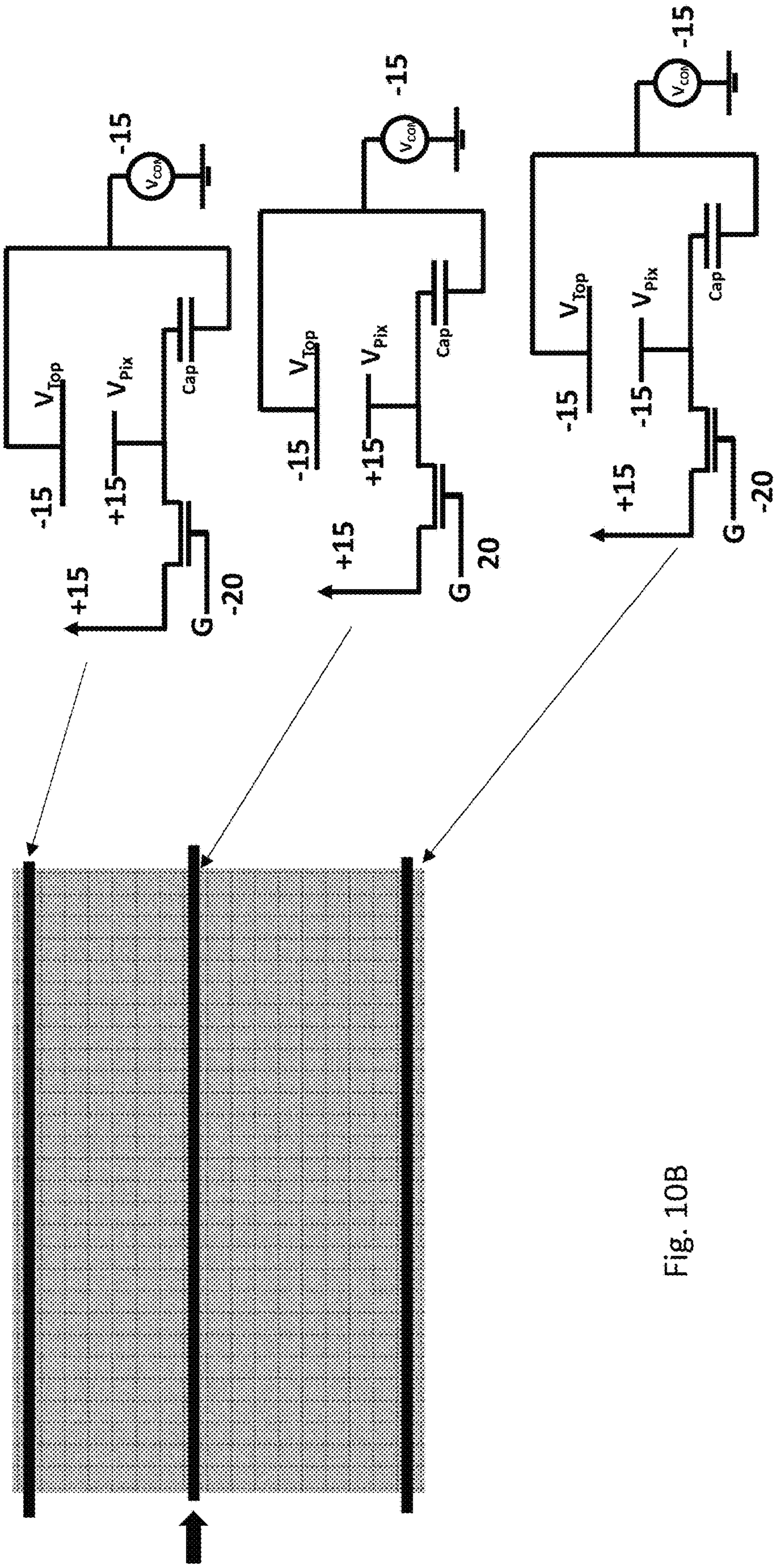
FIG. 10B illustrates the voltages at various points in exemplary equivalent circuit of a three different pixels driven as shown in FIG. 10A. The gate of the top pixel has already opened and closed while $V_{com}$ is at −15V The gate of the middle pixel is currently open while $V_{com}$ is at −15V The gate of the bottom pixel has not yet opened while $V_{com}$ is at −15V.
Figure 10C:
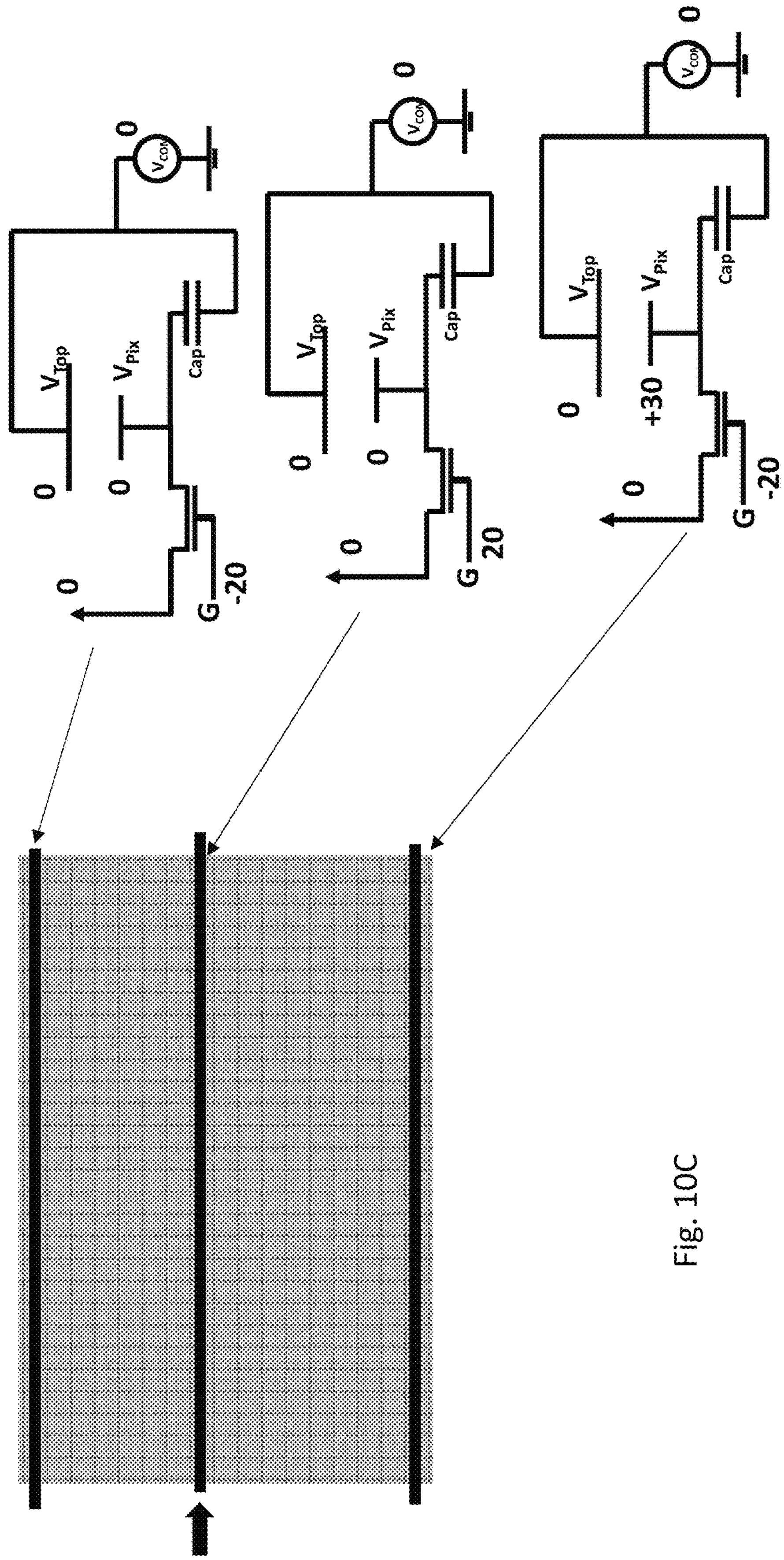
FIG. 10C illustrates the voltages at various points in exemplary equivalent circuit of a three different pixels driven as shown in FIG. 10A. The gate of the top pixel has already opened and closed while VS and $V_{com}$ are at 0V The gate of the middle pixel is currently open while $V_S$ and $V_{com}$ are at 0V The gate of the bottom pixel has not yet opened while $V_S$ and $V_{com}$ are at 0V. Because of the short amount of time since the gate of the bottom pixel was opened, the voltage "seen" by the pixel electrode in the bottom pixel is higher than 0V, but within the operational range for an a-Si transistor.
Figure 10D:
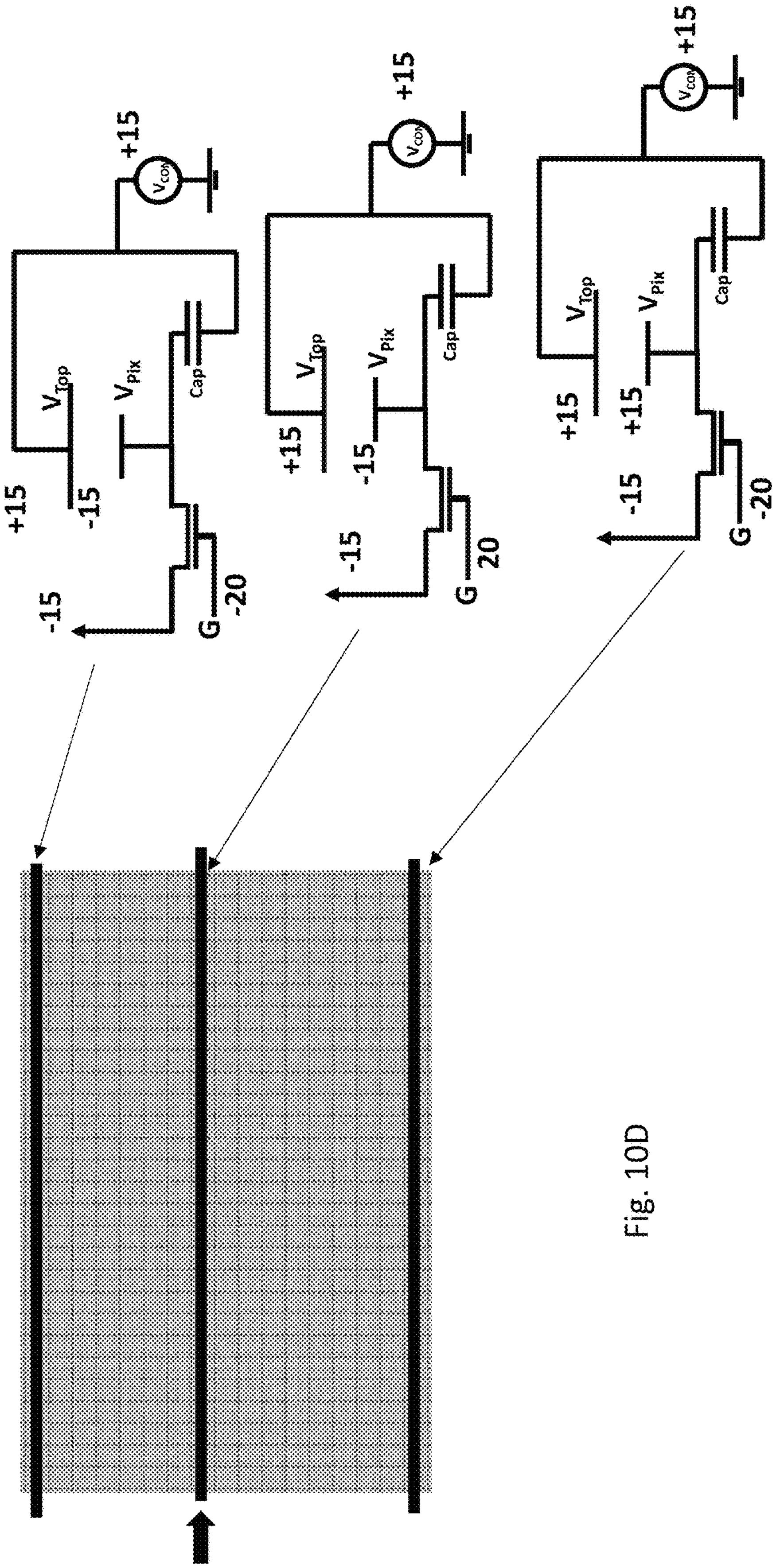
FIG. 10D illustrates the voltages at various points in exemplary equivalent circuit of a three different pixels driven as shown in FIG. 10A. The gate of the top pixel has already opened and closed while $V_{com}$ is at +15V The gate of the middle pixel is currently open while $V_{com}$ is at −+15V. The gate of the bottom pixel has not yet opened while $V_{com}$ is at +15V.
Figure 10E:
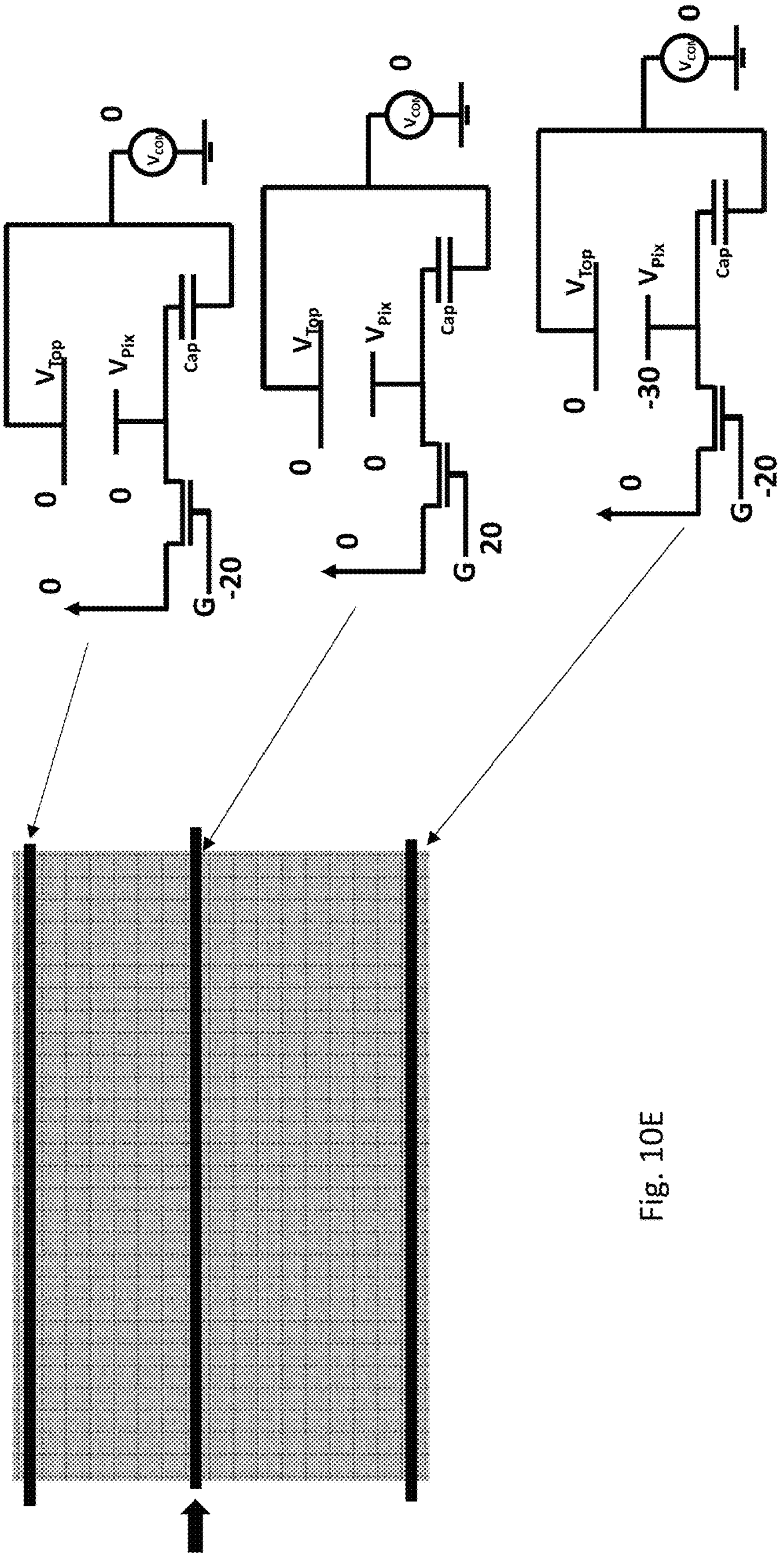
FIG. 10E illustrates the voltages at various points in exemplary equivalent circuit of a three different pixels driven as shown in FIG. 10A. The gate of the top pixel has already opened and closed while $V_S$ and $V_{com}$ are at 0V. The gate of the middle pixel is currently open while $V_S$ and $V_{com}$ are at 0V. The gate of the bottom pixel has not yet opened while $V_S$ and $V_{com}$ are at 0V Because of the short amount of time since the gate of the bottom pixel was opened, the voltage "seen" by the pixel electrode in the bottom pixel is lower than 0V, but within the operational range for an a-Si transistor.
Figure 10F:
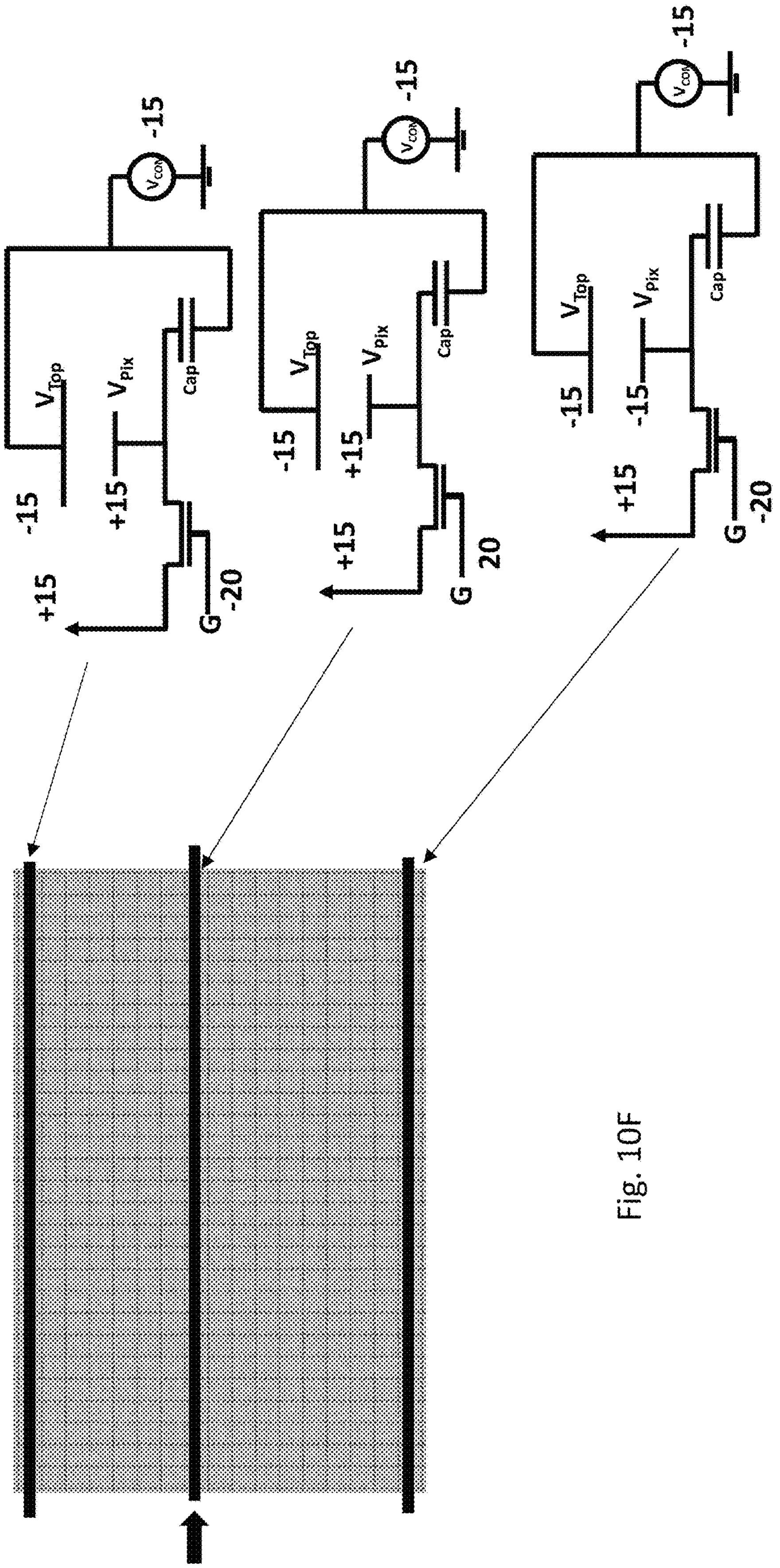
FIG. 10F illustrates the voltages at various points in exemplary equivalent circuit of a three different pixels being returned to the condition of FIG. 10B.
Figure 11A:
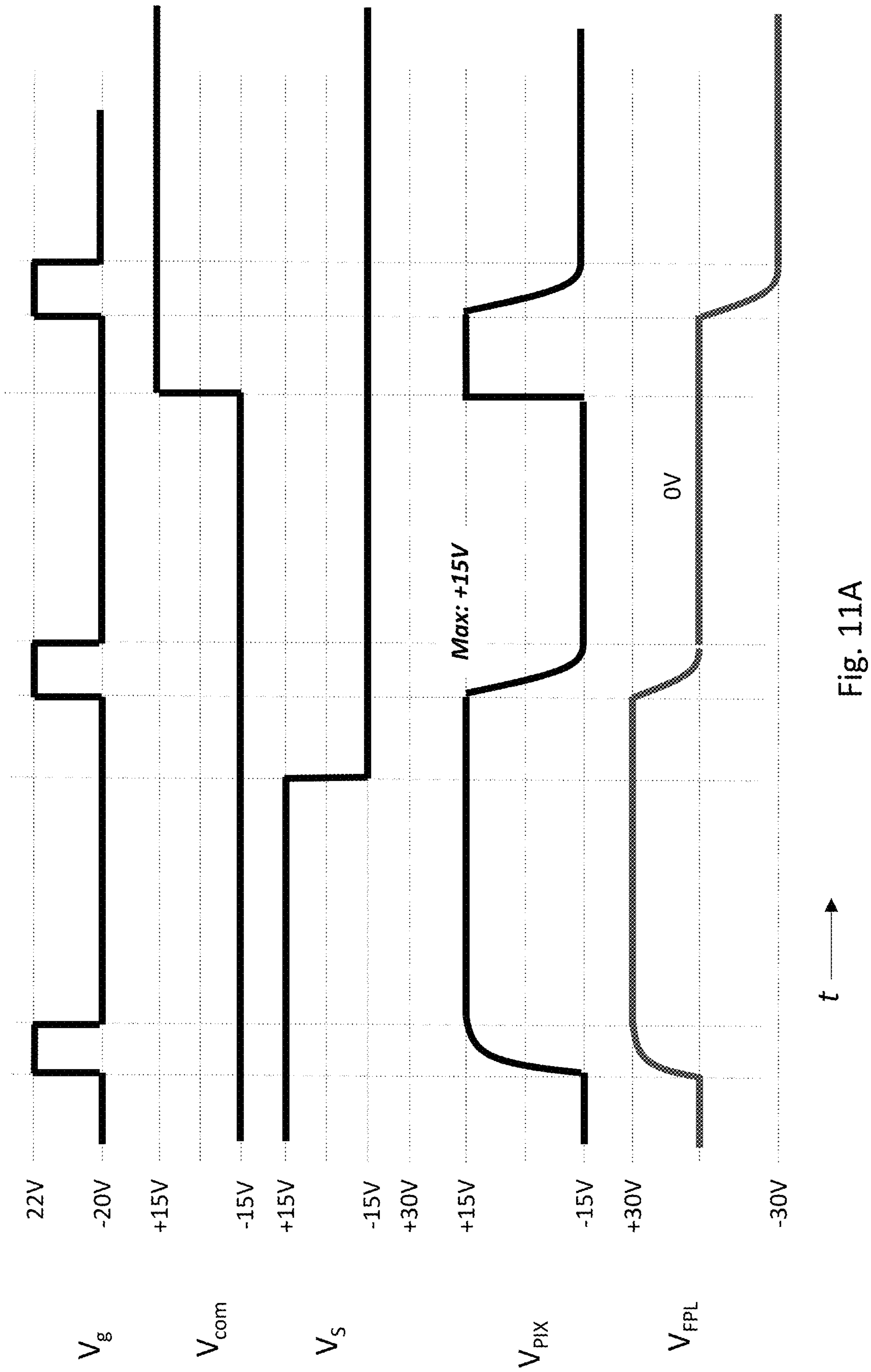
FIG. 11A illustrates the voltage "seen" by a pixel electrode when top plane switching is used but $V_{com}$ and $V_S$ are "shorted" to each other between switching the top plane from low voltage to high voltage. (Typically, $V_{com}$ and $V_S$ are not actually shorted but provided the same voltage from the controller.)
Figure 11B:
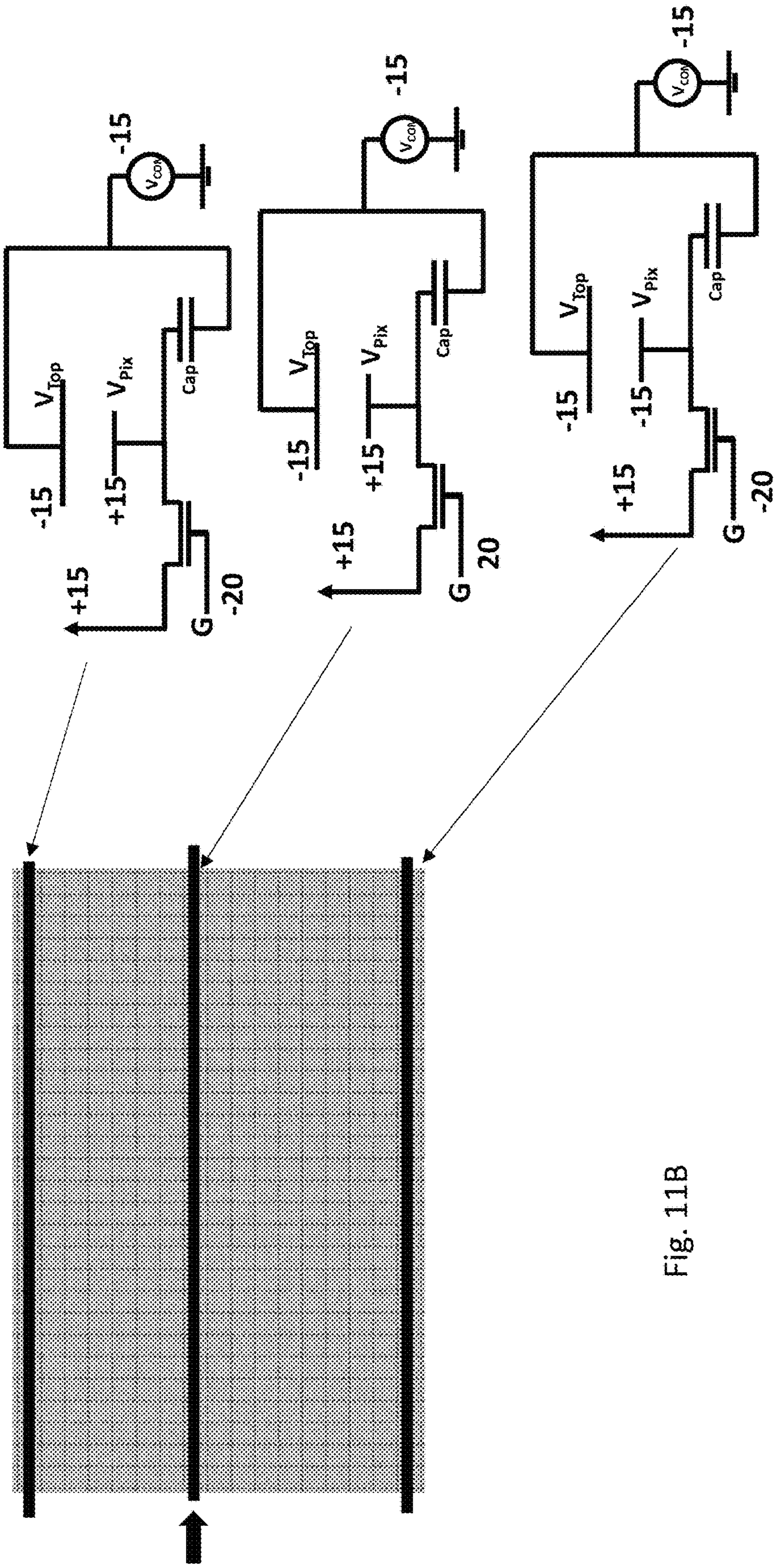
FIG. 11B illustrates the voltages at various points in exemplary equivalent circuit of a three different pixels driven as shown in FIG. 11A. The gate of the top pixel has already opened and closed while $V_{com}$ is at −15V. The gate of the middle pixel is currently open while $V_{com}$ is at −15V. The gate of the bottom pixel has not yet opened while $V_{com}$ is at −15V.
Figure 11C:
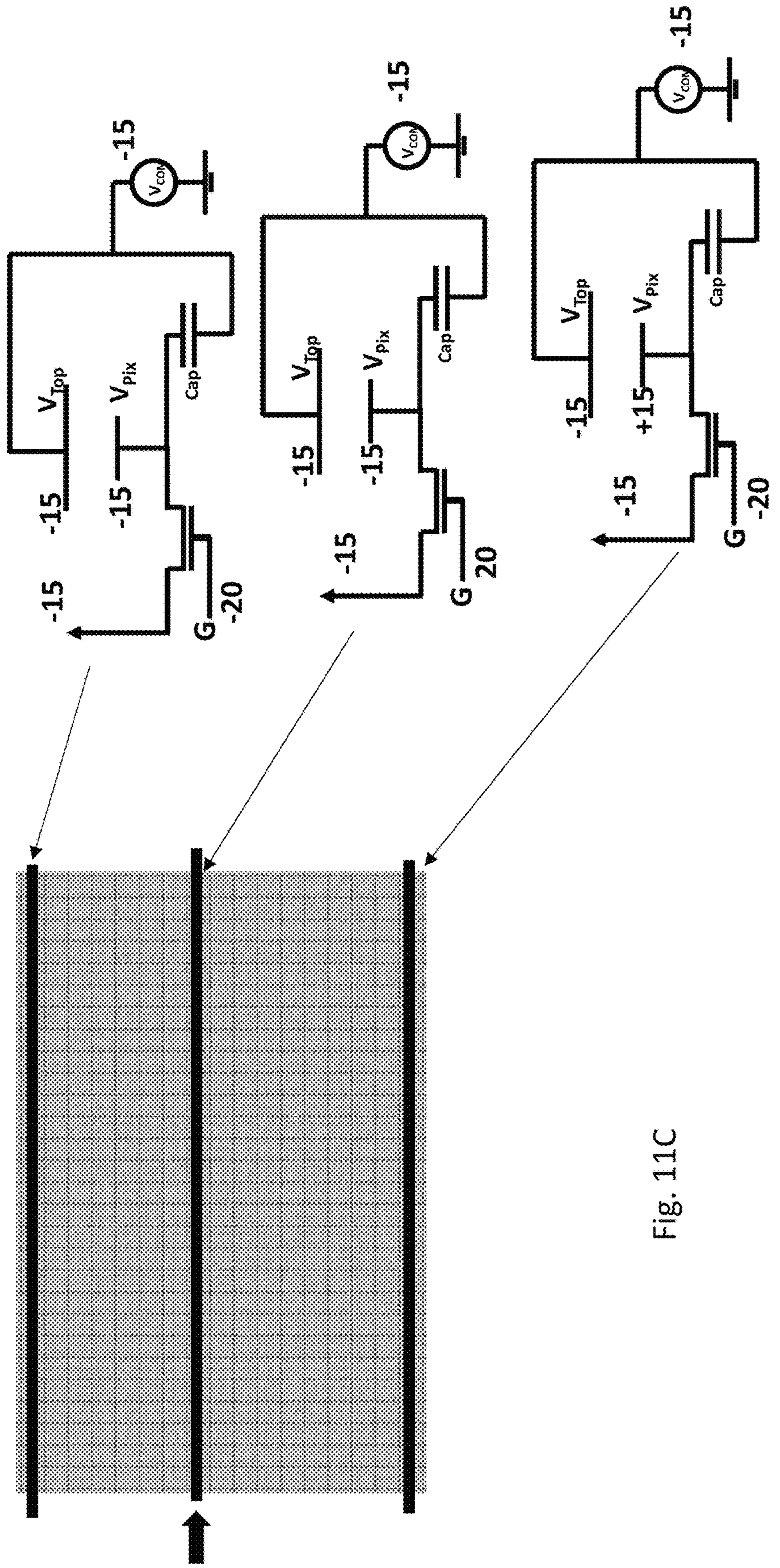
FIG. 11C illustrates the voltages at various points in exemplary equivalent circuit of a three different pixels driven as shown in FIG. 11A. The gate of the top pixel has already opened and closed while $V_S$=$V_{com}$=−15V. The gate of the middle pixel is currently open while $V_S$=$V_{com}$=−15V. The gate of the bottom pixel has not yet opened while $V_S$=$V_{com}$=−15V. Because of the short amount of time since the gate of the bottom pixel was opened, the voltage "seen" by the pixel electrode in the bottom pixel is higher than 0V, but because $V_S$=$V_{com}$=−15V, the pixel electrode is only "seeing" +15V, which is not only within operational range for an a-Si transistor, but the lack of an impulse on the pixel electrodes in the last row diminished inhomogeneities in display color or droplet movement.
Figure 11D:
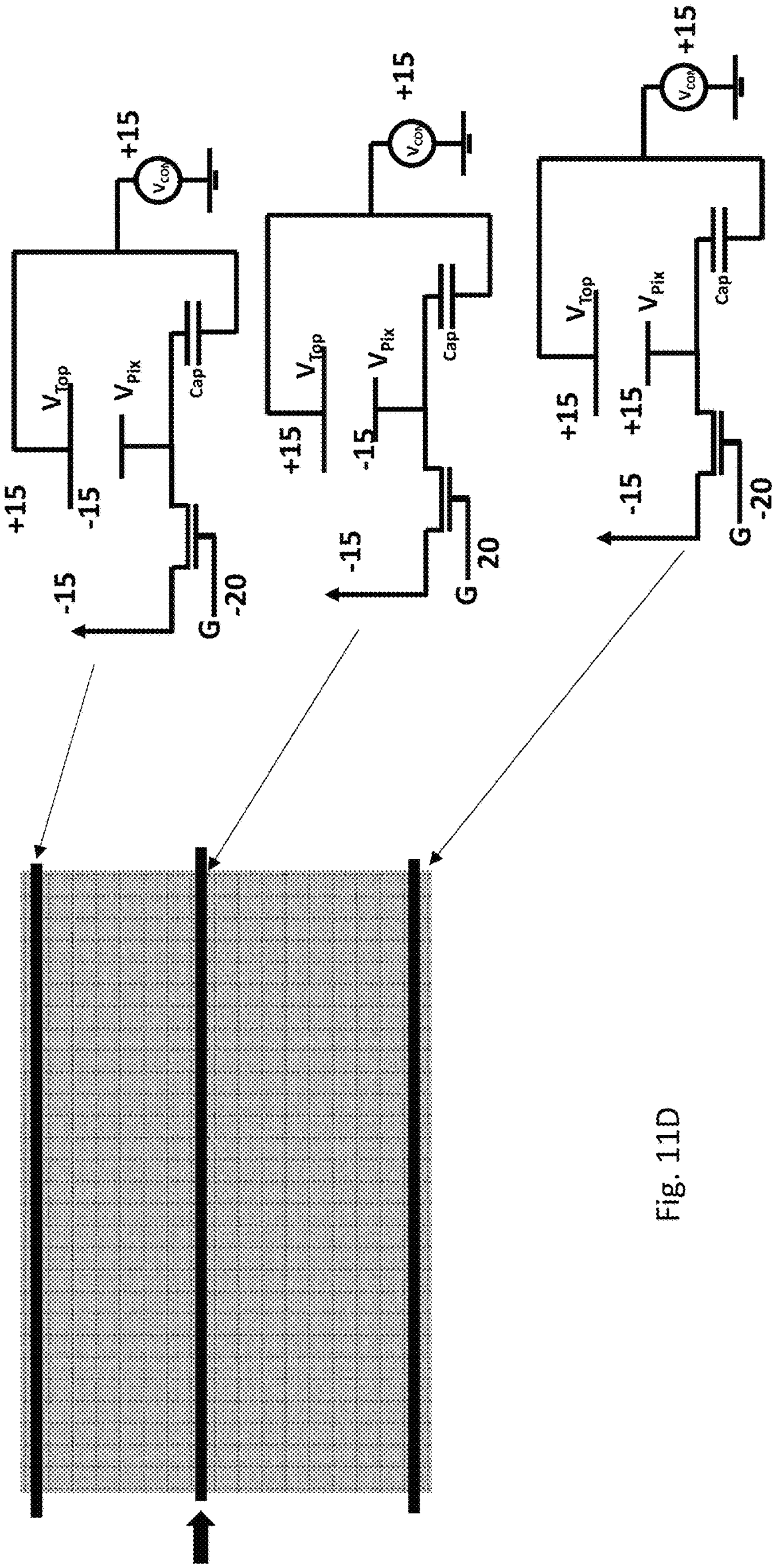
FIG. 11D illustrates the voltages at various points in exemplary equivalent circuit of a three different pixels driven as shown in FIG. 11A. The gate of the top pixel has already opened and closed while $V_{com}$ is at +15V. The gate of the middle pixel is currently open while $V_{com}$ is at −+15V. The gate of the bottom pixel has not yet opened while $V_{com}$ is at +15V.
Figure 11E:
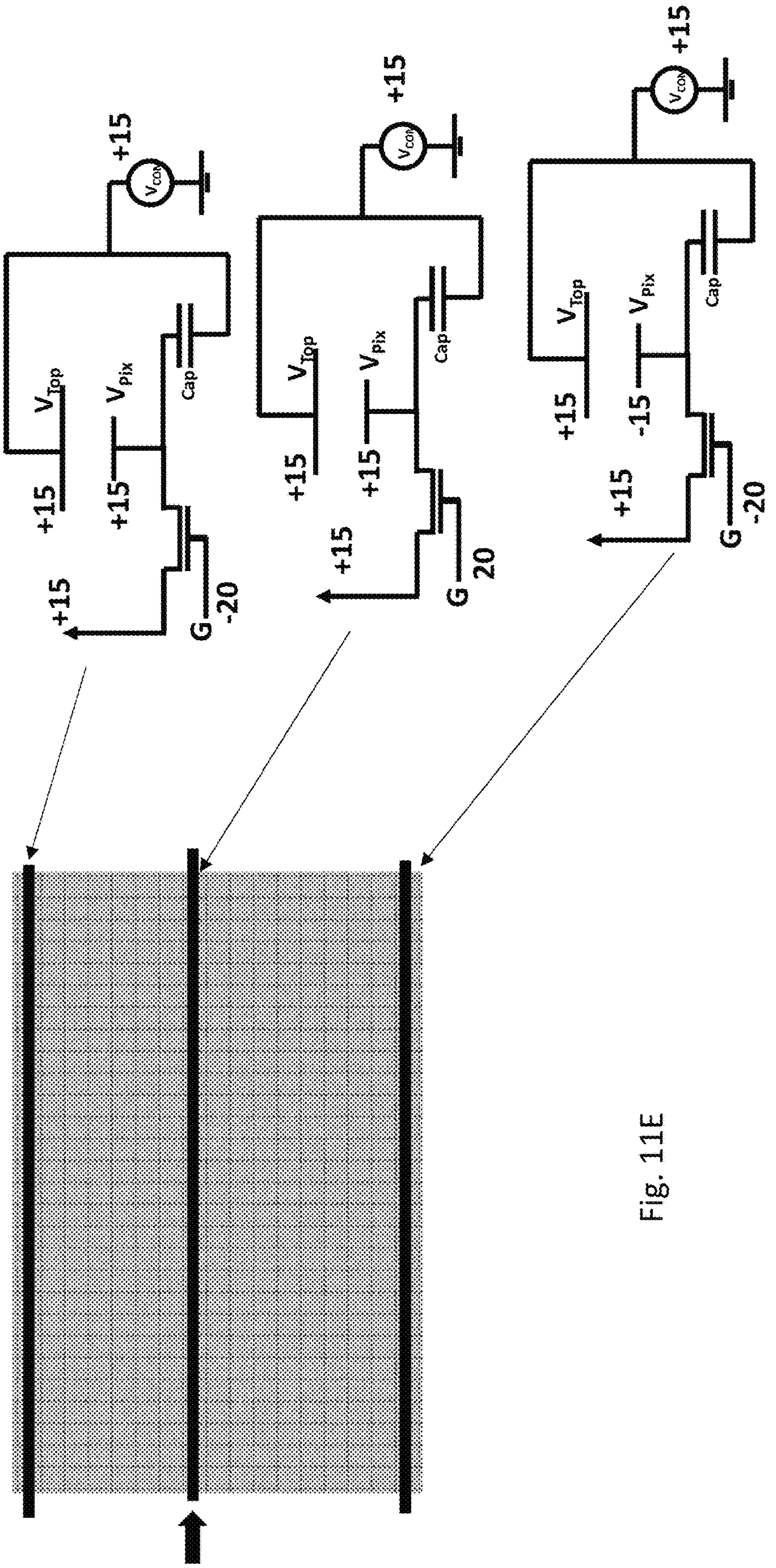
FIG. 11E illustrates the voltages at various points in exemplary equivalent circuit of a three different pixels driven as shown in FIG. 11A. The gate of the top pixel has already opened and closed while $V_S$=$V_{com}$=15V. The gate of the middle pixel is currently open while $V_s$=$V_{com}$=15V. The gate of the bottom pixel has not yet opened while $V_S$=$V_{com}$=15V. Again, the voltage "seen" by the bottom pixel is only −15V.
Figure 11F:
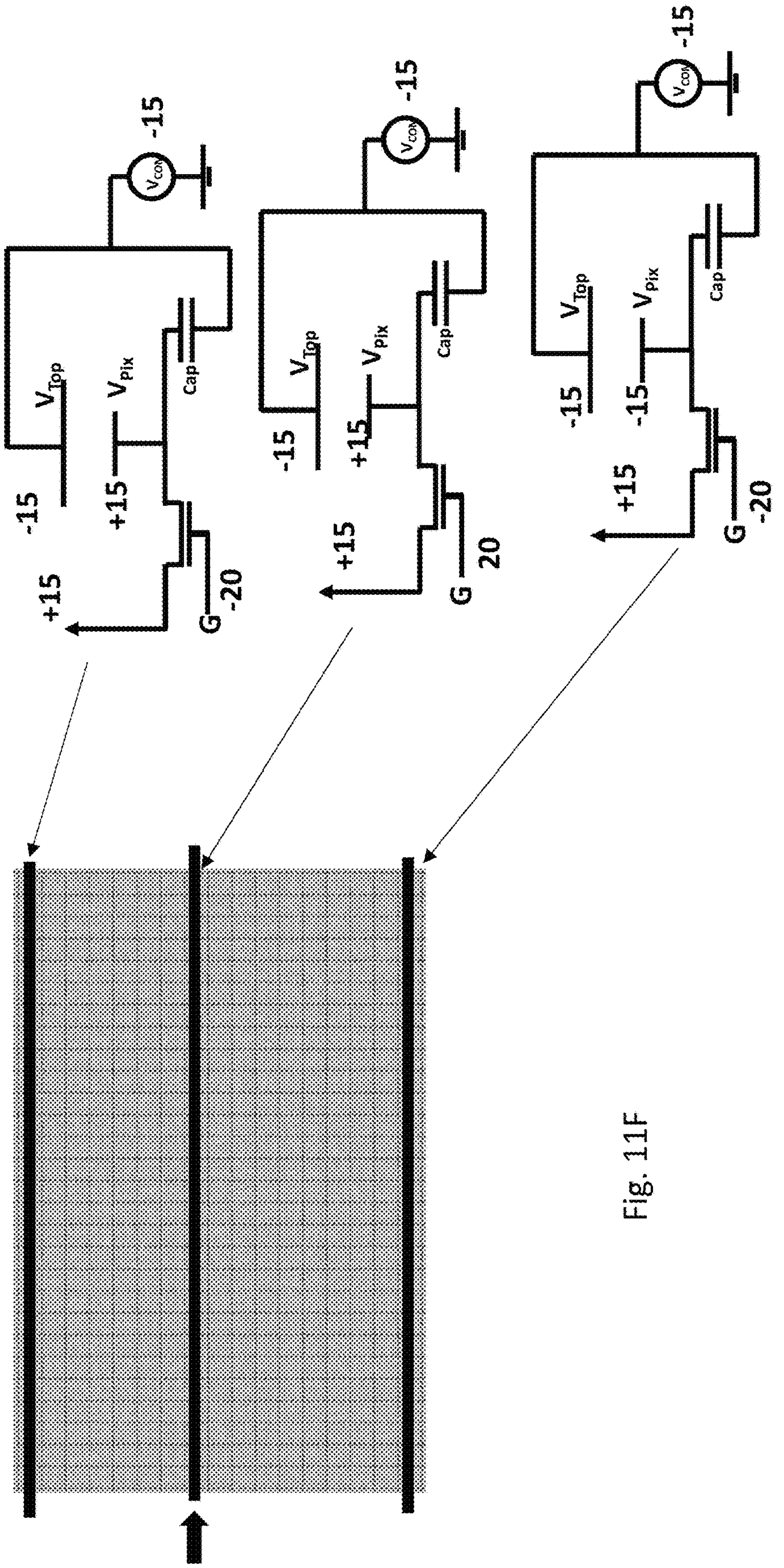
FIG. 11F illustrates the voltages at various points in exemplary equivalent circuit of a three different pixels being returned to the condition of FIG. 11B.

FIG. 10A shows three frames of switching where the voltage on the medium ($V_{FPL}$); electro-optic medium) is switched from +30V to −30V The frames preceding the +30V and following the −30V are not actually important for the purpose of explanation. The three frames could be part of a reset pulse for an electrophoretic medium or part of a color addressing pulse of an electrophoretic medium. In the example of FIG. 10A, $V_{COM}$ and $V_S$ are both taken to 0V for a single frame, resulting in the voltage on the medium also experiencing a frame of 0V. As in FIG. 8A, the pixel experiencing these pulses is not in the first row of electrodes, thus $V_{COM}$ and $V_S$ are switched some time before the gate pulse arrives. Only after the gate is opened can $V_{PIX}$ to go to $V_S$. Before the gate is opened, however, $V_{PIX}$ is capacitively-coupled to $V_{COM}$, and drifts toward $V_{COM}$. Thus when the gate opens, there is still a sizeable jump in the absolute voltage on the pixel electrode, i.e., going to +30V While this is large, +30V is not out of the operating range of the system and is less likely to cause damage to the TFT or pixel electrode. When the top-plane is finally switched after the zero frame, $V_{PIX}$ undergoes another spike, however this time it is only to +15V. To some extent, the +45V spike shown in FIG. 8A has been distributed over two frames, which decreases the risk of damage to the device. Similar to FIGS. 8B-8D, the voltages on various locations of the circuit can be identified depending upon the row of the pixel and the stage of the update. FIG. 10B-10D show the sequence of the first three frames of FIG. 10A, FIG. 10E shows another zero frame insertion and FIG. 10F is a return to the original state of FIG. 10B.

It is understood that, even though the corresponding −30V to +30V pulse sequences are not shown in the figures, the driving polarity is arbitrary. Thus, the polarity of the pulse sequences can be flipped in order to achieve the same electrical performance, but with the opposite polarity. Of course, flipped polarities may have a real effect on the display medium or the electrophoretic propulsion, i.e., switching from white to black instead of from black to white, or causing a droplet to stay on a pixel electrode rather than move to an adjacent pixel electrode. Nonetheless, the driving waveforms and the methods of driving are identical except for the polarity of the voltage. Additionally, the pulse sequences described may be spaced apart with intervening frames of no voltage, for example, to stretch out the waveform. The sequences can also be repeated any number of times for the sake of repetitive driving, or to improve an ultimate optical state. The sequences described herein may also be combined as desired.

An alternative method of decreasing the strain on the TFT circuit and improving driving consistency is to take $V_S$ to $V_{COM}$ between top plane switches. This method is illustrated in FIGS. 11A-11E. By having $V_S$ "follow" $V_{COM}$ by one frame, prior to a top plane switch, the total absolute voltage on the pixel electrode is even further diminished, reaching a peak of +15V and −15V. This method can also be referred to as a $V_S$ pre-pulse method because the $V_S$ voltage level is simple the next $V_{COM}$, but one frame early. Again, as in FIG. 10A, the total voltage on the medium goes to zero between frames. A further benefit is that, for the later pixel rows, the equilibration of $V_S$ and $V_{COM}$ is quicker because there is less excess charge on $V_{PIX}$ to remove. The details of switching $V_{FPL}$ from +30V to −30V and back again are detailed in FIGS. 11B-11E. Theoretically, it is equivalent to match $V_{COM}$ to $V_S$ during the zero frame, however because of the speed of the transistor gate opening, it is typically better to have $V_S$ switch to match the previous $V_{COM}$ before a new $V_{COM}$ is set.

Thus, the invention provides for improved top plane switching for driving electro-optic displays. Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method of driving an electro-optic display comprising a layer of electro-optic material disposed between a top electrode and a backplane, the backplane including an array of pixel electrodes, wherein each pixel electrode is coupled to a thin film transistor (TFT) and a storage capacitor, the TFT including a source, a gate, and a drain, wherein the gate is coupled to a gate line, the source is coupled to a scan line, and the drain is coupled to the pixel electrode, wherein a controller provides time-dependent voltages to the gate line, the scan line, the top electrode, and the storage capacitor, wherein a first side of the storage capacitor is coupled to the pixel electrode and a second side of the storage capacitor is coupled to the controller, the method of driving comprising (in order):

a) providing a first high voltage to the scan line and a first low voltage to the top electrode and the second side of the storage capacitor;

b) providing a first gate pulse sufficient to open the TFT;

c) after the first gate pulse, providing a zero voltage to the scan line, the top electrode and the second side of the storage capacitor;

d) providing a second gate pulse sufficient to open the TFT;

e) after the second gate pulse, providing a second low voltage to the scan line and a second high voltage to the top electrode and the second side of the storage capacitor; and f) providing a third gate pulse sufficient to open the TFT.

2. The method of claim 1, wherein steps a)-f) are completed in three subsequent frames.

3. The method of claim 1, wherein the top electrode is light-transmissive.

4. The method of claim 1, wherein the top electrode and the second side of the storage capacitor are electrically coupled to a common node.

5. The method of claim 1, wherein the TFT is fabricated from amorphous silicon.

6. The method of claim 5, wherein the first and second high voltage are +15V.

7. The method of claim 6, wherein the first and second low voltages are −15V.

8. The method of claim 1, wherein the layer of electro-optic material includes an encapsulated electrophoretic medium comprising a plurality of types of charged particles that move between the top electrode and the backplane in response to an applied electric field.

9. The method of claim 8, wherein the electrophoretic medium is encapsulated in a plurality of microcapsules or encapsulated in a plurality of sealed microcells.

10. The method of claim 8, wherein the encapsulated electrophoretic medium comprises four different types of charged particles.

11. A method of driving an electro-optic display comprising a layer of electro-optic material disposed between a top electrode and a backplane, the backplane including an array of pixel electrodes, wherein each pixel electrode is coupled to a thin film transistor (TFT) and a storage capacitor, the TFT including a source, a gate, and a drain, wherein the gate is coupled to a gate line, the source is coupled to a scan line, and the drain is coupled to the pixel electrode, wherein a controller provides time-dependent voltages to the gate line, the scan line, the top electrode, and the storage capacitor, wherein a first side of the storage capacitor is coupled to the pixel electrode and a second side of the storage capacitor is coupled to the controller, the method of driving comprising (in order):

a) providing a first high voltage to the scan line and a first low voltage to the top electrode and the second side of the storage capacitor;

b) providing a first gate pulse sufficient to open the TFT;

c) after the first gate pulse, providing a second low voltage to the scan line;

d) providing a second gate pulse sufficient to open the TFT;

e) after the second gate pulse, providing a second high voltage to the top electrode and the second side of the storage capacitor; and f) providing a third gate pulse sufficient to open the TFT.

12. The method of claim 11, wherein steps a)-f) are completed in three subsequent frames.

13. The method of claim 11, wherein the top electrode is light-transmissive.

14. The method of claim 11, wherein the top electrode and the second side of the storage capacitor are electrically coupled to a common node.

15. The method of claim 11, wherein the TFT is fabricated from amorphous silicon.

16. The method of claim 15, wherein the first and second high voltages are +15V.

17. The method of claim 16, wherein the first and second low voltages are −15V.

18. The method of claim 11, wherein the layer of electro-optic material includes an encapsulated electrophoretic medium comprising a plurality of types of charged particles that move between the top electrode and the backplane in response to an applied electric field.

19. The method of claim 18, wherein the electrophoretic medium is encapsulated in a plurality of microcapsules or encapsulated in a plurality of sealed microcells.

20. The method of claim 18, wherein the encapsulated electrophoretic medium comprises four different types of charged particles.

* * * * *